United States Patent
Terada et al.

(10) Patent No.: US 7,550,911 B2
(45) Date of Patent: Jun. 23, 2009

(54) FLUORESCENT LAMP FOR USE IN A BACKLIGHT UNIT AND LIQUID CRYSTAL DISPLAY DEVICE

(75) Inventors: Toshihiro Terada, Hyogo-ken (JP); Masanobu Murakami, Osaka-fu (JP); Kazuhiro Matsuo, Osaka-fu (JP); Taizou Ono, Osaka-fu (JP); Hideki Wada, Osaka-fu (JP); Shingo Tsutsumi, Osaka-fu (JP); Mitsuharu Kawasaki, Kyoto-fu (JP); Hiroyuki Arata, Hyogo-ken (JP); Yuko Habuta, Hyogo-ken (JP); Tomokazu Matsuura, Osaka-fu (JP); Hirofumi Yamashita, Osaka-fu (JP)

(73) Assignee: Panasonic Corporation, Osaka (JP)

( * ) Notice: Subject to any disclaimer, the term of this patent is extended or adjusted under 35 U.S.C. 154(b) by 30 days.

(21) Appl. No.: 11/429,767

(22) Filed: May 8, 2006

(65) Prior Publication Data
US 2006/0261723 A1 Nov. 23, 2006

(30) Foreign Application Priority Data

| May 13, 2005 | (JP) | ............................ 2005-141745 |
| Jul. 6, 2005 | (JP) | ............................ 2005-197248 |
| Jul. 29, 2005 | (JP) | ............................ 2005-219982 |
| Jul. 29, 2005 | (JP) | ............................ 2005-221206 |
| Jan. 26, 2006 | (JP) | ............................ 2006-017275 |

(51) Int. Cl.
*H01J 1/62* (2006.01)
*H01J 11/00* (2006.01)
*H01J 65/00* (2006.01)

(52) U.S. Cl. ...................... 313/489; 313/485; 313/607; 313/234

(58) Field of Classification Search .................. None
See application file for complete search history.

(56) References Cited

U.S. PATENT DOCUMENTS

| 2,106,744 | A | * | 2/1938 | Hood et al. ................. 502/439 |
| 5,470,805 | A | * | 11/1995 | Filmer ......................... 501/55 |
| 5,869,927 | A | * | 2/1999 | Matsuo et al. .............. 313/485 |
| 2001/0000436 | A1 | * | 4/2001 | Nose et al. ................... 349/65 |
| 2002/0070660 | A1 | * | 6/2002 | Moon ......................... 313/483 |
| 2002/0070682 | A1 | * | 6/2002 | Atagi ......................... 315/246 |
| 2003/0178931 | A1 | | 9/2003 | Asano |
| 2003/0218415 | A1 | * | 11/2003 | Matsuo ....................... 313/485 |
| 2004/0178731 | A1 | * | 9/2004 | Takeda et al. .............. 313/607 |
| 2004/0222743 | A1 | | 11/2004 | Takagi et al. |

(Continued)

FOREIGN PATENT DOCUMENTS

CN 1333549 1/2002

(Continued)

*Primary Examiner*—Toan Ton
*Assistant Examiner*—Britt Hanley

(57) ABSTRACT

A backlight unit has an external electrode fluorescent lamp in an housing. The external electrode fluorescent lamp includes a glass bulb having a discharge space inside, and electrodes around both ends of the glass bulb. A protective layer and a phosphor layer are formed on an internal surface of the glass bulb in this order. The glass bulb is made of soda glass, and sodium oxide precipitated from this soda glass appears on part of the internal surface of the glass bulb where the protective layer is not formed, so as to be exposed to the discharge space.

23 Claims, 25 Drawing Sheets

U.S. PATENT DOCUMENTS

| | | | |
|---|---|---|---|
| 2005/0029947 A1* | 2/2005 | Kraus et al. | 313/594 |
| 2005/0184640 A1* | 8/2005 | Yamashita et al. | 313/493 |
| 2006/0055326 A1 | 3/2006 | Takeda et al. | |

FOREIGN PATENT DOCUMENTS

| | | |
|---|---|---|
| CN | 1465090 | 12/2003 |
| JP | 1040865 | 2/1989 |
| JP | 2001-015065 | 1/2001 |
| JP | 2003-007252 | 1/2003 |
| JP | 2003-17005 | 1/2003 |
| JP | 2003-036815 | 2/2003 |
| JP | 2003-91007 | 3/2003 |
| JP | 2003091007 * | 3/2003 |
| JP | 2003-123691 | 4/2003 |
| JP | 2004-22209 | 1/2004 |
| JP | 2004-146351 | 5/2004 |
| JP | 2004146351 * | 5/2004 |
| JP | 2004-319468 | 11/2004 |
| WO | WO 03/103011 A1 * | 12/2003 |

* cited by examiner

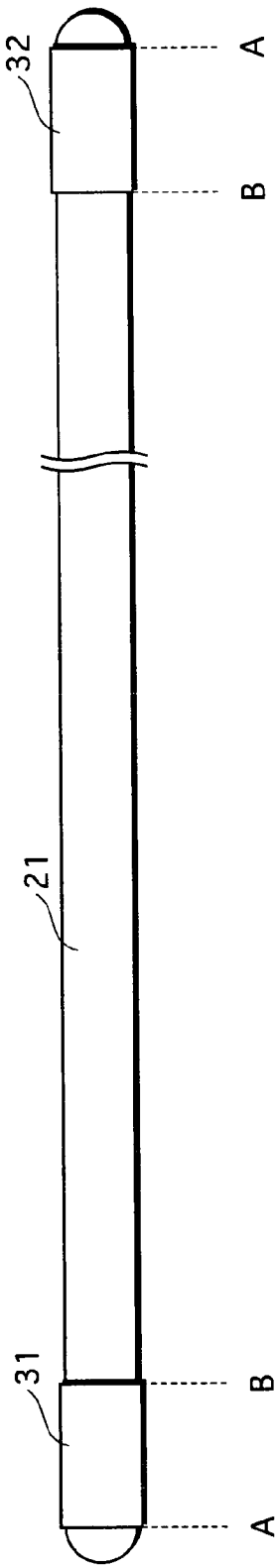
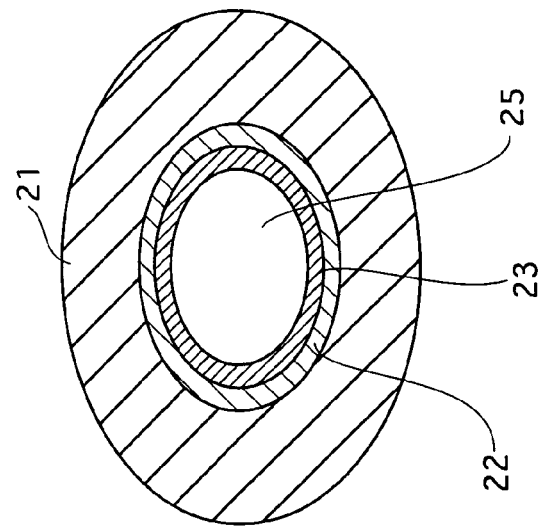
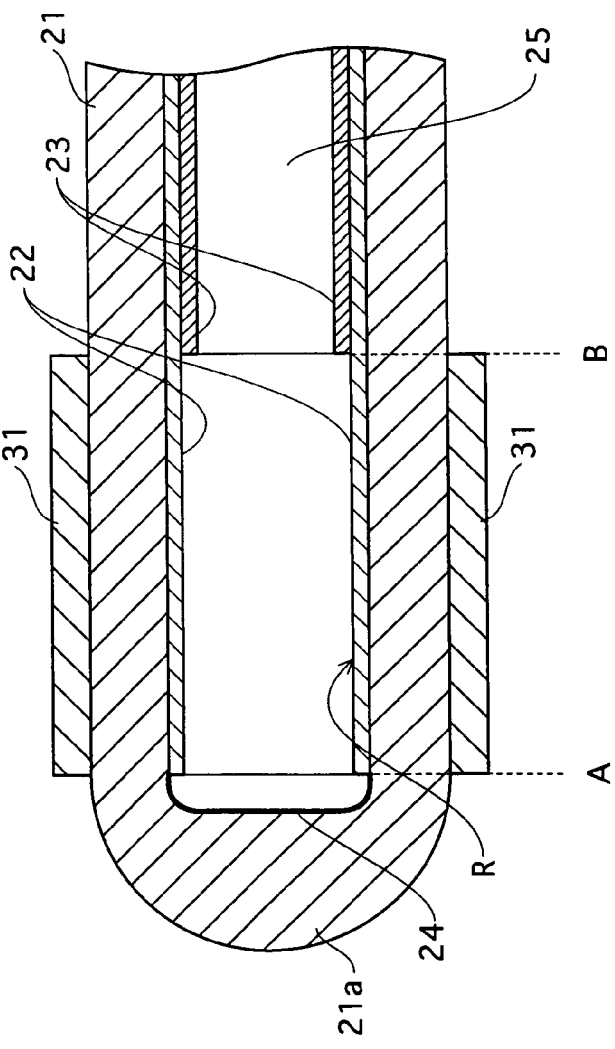
FIG.5A
FIG.5C
FIG.5B

FIG.6

| | No | IN-DARK STARTING TIME | EVALUATION |
|---|---|---|---|
| CONVENTIONAL SAMPLE | 1 | 17 | X |
| | 2 | 18 | X |
| | 3 | 6 | X |
| | 4 | UNLIT | X |
| | RESULT | | 0/4 |
| PRESENT INVENTION SAMPLE | 1 | 0.08 | ○ |
| | 2 | 0.8 | ○ |
| | 3 | 0.24 | ○ |
| | 4 | 0.32 | ○ |
| | RESULT | | 4/4 |

FIG.8

| | B | G | R |
|---|---|---|---|
| | BaMg$_2$Al$_{16}$O$_{27}$:Eu$^{2+}$ | BaMg$_2$Al$_{16}$O$_{27}$:Eu$^{2+}$,Mn$^{2+}$ | Y$_2$O$_3$:Eu$^{3+}$ |
| 313nm ABSORPTION (EXCITATION) | ○ | ○ | × |
| WEIGHT PERCENTAGE IN COMPOSITION | 50%~90% | | REMAINDER |

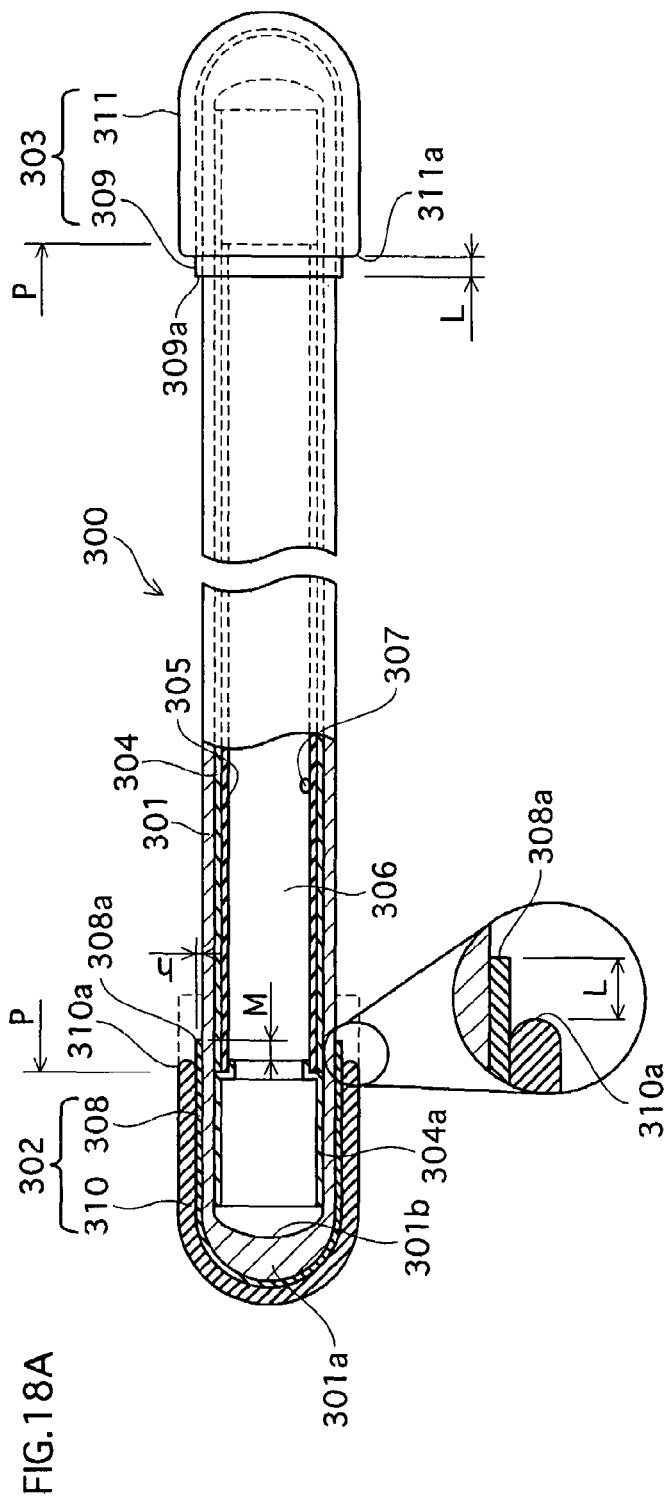
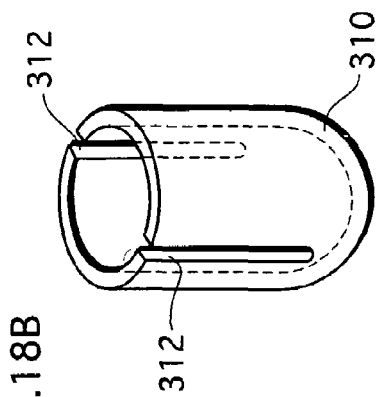
FIG.18A
FIG.18B

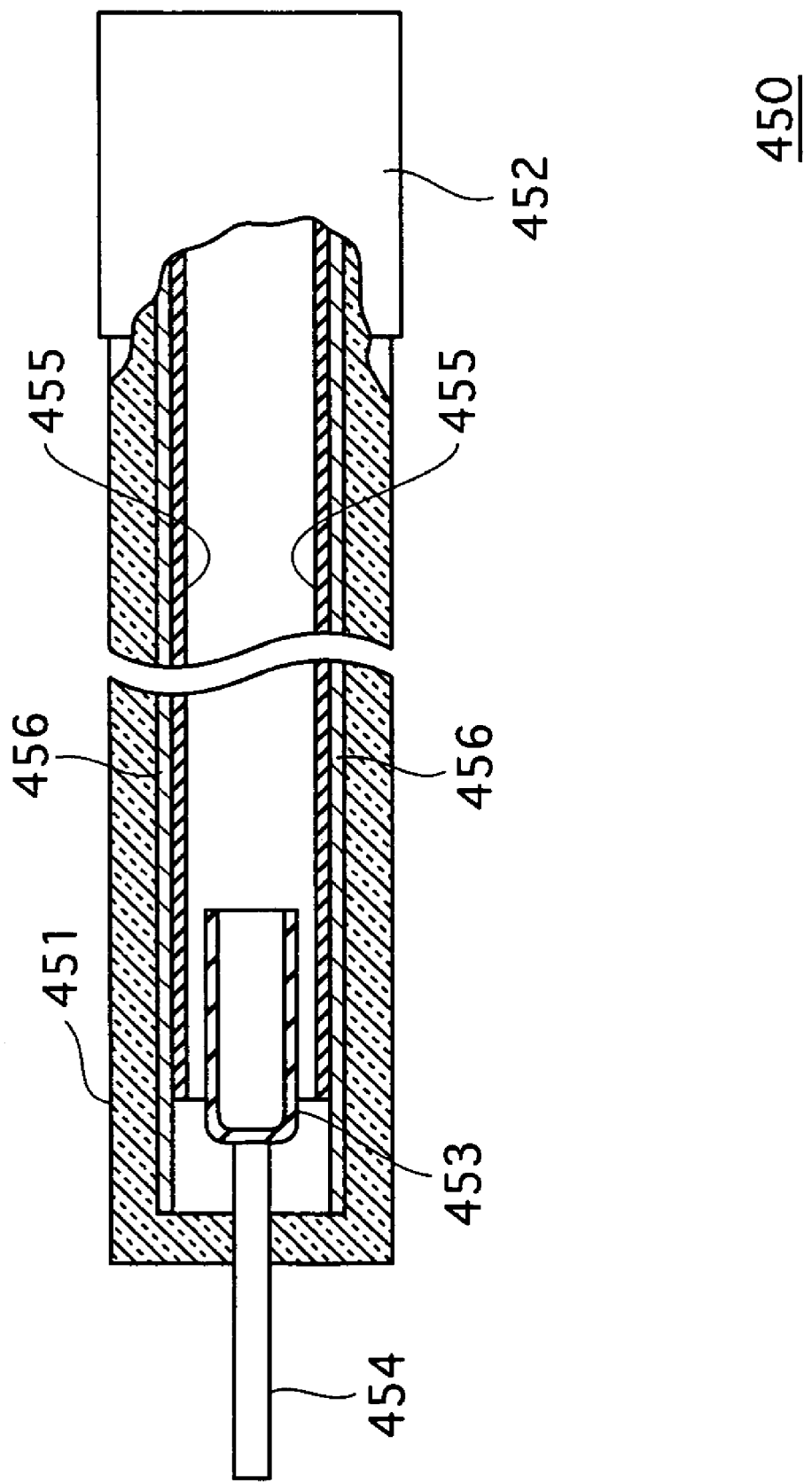

FLUORESCENT LAMP FOR USE IN A BACKLIGHT UNIT AND LIQUID CRYSTAL DISPLAY DEVICE

This application is based on applications Nos. 2005-141745, 2005-197248, 2005-219982, 2005-221206, and 2006-017275 filed in Japan, the contents of which are hereby incorporated by reference.

BACKGROUND OF THE INVENTION

1. Field of the Invention

The present invention relates to a fluorescent lamp having electrodes at both ends of a tubular glass bulb, and a backlight unit and a liquid crystal display device including the fluorescent lamp as a light source. The present invention in particular relates to techniques for improvement in in-dark starting characteristic.

2. Related Art

Due to recent increases in size of liquid crystal display screens, the demand for backlight units for large-screen use is on the increase. Fluorescent lamps, such as external electrode fluorescent lamps having electrodes outside a glass bulb and cold cathode fluorescent lamps having electrodes inside a glass bulb, have been developed for use in such backlight units.

These fluorescent lamps, however, have the following problem. In darkness, it takes time to light up a fluorescent lamp, that is, the fluorescent lamp cannot be started immediately when a starting voltage is applied. To improve this in-dark starting characteristic, a technique of applying an electron emissive material having a high secondary-emission coefficient, e.g. a cesium compound, to an inner surface of a glass bulb at both ends has been proposed. According to this technique, secondary electrons emitted from the cesium compound coating facilitate a discharge when starting the lamp. Thus, the in-dark starting characteristic can be improved (e.g. Japanese Patent Application Publication No. 2001-15065).

However, though the in-dark starting characteristic can certainly be improved, this technique requires a troublesome operation of applying the cesium compound to the inner surface of the glass bulb.

SUMMARY OF THE INVENTION

In view of the above problem, the present invention aims to provide a fluorescent lamp, a backlight unit, and a liquid crystal display device having an in-dark starting characteristic that can be easily improved without a troublesome operation.

The stated aim can be achieved by a fluorescent lamp including: a glass bulb having a discharge space inside; and electrodes provided at both ends of the glass bulb, wherein a protective layer is formed on an inner surface of the glass bulb, except a part of the inner surface at at least one of the ends, a phosphor layer is formed on the protective layer, and an alkaline metal precipitated from the glass bulb appears on the part of the inner surface where the protective layer is absent.

The alkaline metal referred to here represents a concept that includes both alkali metals (group I) and alkaline earth metals (group II).

Also, the fluorescent lamp referred to here represents a concept that at least includes both external electrode fluorescent lamps having electrodes outside a glass bulb and cold cathode fluorescent lamps having cold cathode electrodes inside a glass bulb.

Also, the part of the inner surface of the glass bulb where the protective layer is absent is not limited in terms of shape, size, number, and the like, so long as it is situated at at least one end of the glass bulb. Preferably, the part of the inner surface of the glass bulb where the protective layer is absent is situated at both ends of the glass bulb.

Also, the precipitated alkaline metal may be present in the state of a film, a powder, or a combination thereof.

According to this construction, the alkaline metal exists in an area of the discharge space where the protective layer is absent. Since the alkaline metal in this area is exposed to the discharge space, the in-dark starting characteristic can be improved.

For example, the alkaline metal is precipitated from the glass bulb by heat. Heat generated when baking the phosphor layer or when sealing the ends of the glass bulb can be used for this purpose, with there being no need to perform a special heating step for precipitating the alkaline metal.

Here, the glass bulb may contain sodium oxide in a range of 3 wt % to 20 wt %.

The material of the glass bulb is not particularly limited so long as it contains 3 wt % to 20 wt % sodium oxide. According to this construction, the glass bulb can be processed easily.

Here, the glass bulb may contain sodium oxide in a range of 5 wt % to 20 wt %, wherein the alkaline metal includes sodium.

According to this construction, the glass bulb contains at least sodium oxide in the range of 5 wt % to 20 wt %. This sodium oxide content is greater than, for example, that in conventionally-used borosilicate glass. Therefore, a greater amount of sodium oxide can be precipitated by heat, when compared with the case where borosilicate glass is used. Hence the fluorescent lamp can exhibit a better in-dark starting characteristic than a fluorescent lamp which is formed using borosilicate glass.

Here, the electrodes may be external electrodes provided outside the glass bulb at both ends.

The external electrodes referred to here are not particularly limited in shape, size, and the like.

According to this construction, there is no need to provide the electrodes inside the glass bulb. This enables the fluorescent lamp to be formed with a small external diameter, with it being possible to produce a slim fluorescent lamp.

Here, the protective layer may be composed of an aggregate of metal oxide particles, and have an average thickness of no more than 2 μm and a surface roughness of no more than 1 μm.

According to this construction, since the average thickness of the protective layer composed of the aggregate of metal oxide particles is set to no more than 2 μm, a luminance drop resulting from an increase in thickness of the protective layer can be reduced. Also, since the surface roughness of the protective layer is set to no more than 1 μm for a higher density of the protective layer, problems such as perforation can be suppressed even when a driving current is increased to improve luminance.

Here, the protective layer may contain an electron emissive material selected from the group consisting of a cesium compound, a lithium compound, and a barium compound.

According to this construction, the protective layer contains the electron emissive material such as the cesium compound, the lithium compound, or the barium compound having a high secondary-emission coefficient, so that the in-dark starting characteristic can be further improved.

Here, the protective layer may be composed of an aggregate of metal oxide particles, and have an average thickness of no more than 2 μm, wherein an average cross sectional area of each closed hole between the metal oxide particles in the protective layer is no more than 0.1 $\mu m^2$.

According to this construction, the average thickness of the protective layer composed of the aggregate of metal oxide particles is set to no more than 2 $\mu m$, and the average cross sectional area of each closed hole in the protective layer is set to no more than 0.1 $\mu m^2$, so that problems such as perforation can be suppressed even when a driving current is increased to improve luminance.

Here, the protective layer may contain an electron emissive material selected from the group consisting of a cesium compound, a lithium compound, and a barium compound.

According to this construction, the protective layer contains the electron emissive material such as the cesium compound, the lithium compound, or the barium compound having a high secondary-emission coefficient, so that the in-dark starting characteristic can be further improved.

Here, a number of closed holes per unit area of cross section in the protective layer may be no more than four in 1 $\mu m^2$.

According to this construction, the number of closed holes present in a cross section of the protective layer is no more than four in 1 $\mu m^2$, so that problems such as perforation can be suppressed even when a driving current is increased to improve luminance.

Here, the protective layer may contain a material selected from the group consisting of $Y_2O_3$, MgO, and $La_2O_3$, and have a maximum thickness in a range of 0.5 $\mu m$ to 2 $\mu m$.

According to this construction, the protective layer contains the electron emissive material such as $Y_2O_3$, MgO, or $La_2O_3$ having a high secondary-emission coefficient, with it being possible to further improve the in-dark starting characteristic. Also, by setting the maximum thickness of the protective layer to no more than 2 $\mu m$, a decrease in luminous flux can be avoided. Further, by setting the maximum thickness of the protective layer to no less than 0.5 $\mu m$, even when a driving current is increased (e.g. 5 mA) to improve luminance, a situation where part of the inner surface of the glass bulb corresponding to the external electrodes is eroded and perforated (with pinholes) due to a bombardment with argon ions or mercury ions can be avoided.

Here, a part of the protective layer corresponding in position to at least one of the external electrodes may contain an electron emissive material selected from the group consisting of a cesium compound, a lithium compound, and a barium compound.

According to this construction, part of the protective layer corresponding to at least one of the external electrodes contains the electron emissive material such as the cesium compound, the lithium compound, or the barium compound having a high secondary-emission coefficient, so that the in-dark starting characteristic can be further improved.

Here, the electron emissive material may be situated so as to be more than 2 mm away from an inner end of the external electrode, toward a tip of an end of the glass bulb at which the external electrode is provided.

According to this construction, even if sputtering occurs on the inner surface of the glass bulb near the electrodes during lamp operation, a situation where the electron emissive material scatters and adheres to the phosphor layer can be avoided. Hence it is possible to suppress a luminance drop which is caused by the phosphor layer being discolored due to the adhesion of the scattering electron emissive material.

Here, the phosphor layer may include a phosphor that at least contains magnesium, and be located between inner ends of the external electrodes.

According to this construction, the phosphor containing Mg which is an electron emissive material is positioned corresponding to the external electrodes, so that the in-dark starting characteristic can be further improved.

Here, the glass bulb may be flattened in cross section, with an internal diameter on a minor axis being in a range of 1.6 mm to 4.0 mm.

The internal diameter on the minor axis referred to here denotes a distance between two points at which an imaginary line passing through a center of a cross section of the glass bulb in the minor axis direction meets the inner surface of the glass bulb (or a maximum dimension of the glass bulb in a direction parallel to the minor axis direction). The use of the term "internal diameter" does not exclude cases where the cross section of the glass bulb is not circular or elliptic.

Here, the phosphor layer may be formed entirely between inner ends of the electrodes, wherein the protective layer is formed entirely between outer ends of the electrodes.

According to this construction, the protective layer is wider than the phosphor layer. In this way, the phosphor layer is kept from reacting with the alkaline metal precipitated from the glass bulb and as a result deteriorating.

The stated aim can also be achieved by a fluorescent lamp including: a glass bulb having a discharge space inside; and electrodes provided at both ends of the glass bulb, wherein a phosphor layer is formed on an inner surface of the glass bulb, except at least one part of the inner surface, and an alkaline metal precipitated from the glass bulb appears on the at least one part of the inner surface.

The alkaline metal referred to here represents a concept that includes both alkali metals (group I) and alkaline earth metals (group II).

Also, the fluorescent lamp referred to here represents a concept that at least includes both external electrode fluorescent lamps having electrodes outside a glass bulb and cold cathode fluorescent lamps having cold cathode electrodes inside a glass bulb.

Also, the at least one part of the inner surface of the glass bulb is not limited in terms of shape, size, location, and the like, though in view of the in-dark starting characteristic, it is preferably situated in the vicinity of the electrodes at both ends of the glass bulb.

Also, the precipitated alkaline metal may be present in the state of a film, a powder, or a combination thereof.

According to this construction, the alkaline metal exists in the area where the phosphor layer is not formed, i.e. the part of the inner surface of the glass bulb that is exposed to the discharge space. Since the alkaline metal in this area is exposed to the discharge space, the in-dark starting characteristic can be improved.

For example, the alkaline metal is precipitated from the glass bulb by heat. Heat generated when baking the phosphor layer or when sealing the ends of the glass bulb can be used for this purpose, with there being no need to perform a special heating step for precipitating the alkaline metal.

The stated aim can also be achieved by a backlight unit including the above fluorescent lamp as a light source.

According to this construction, the alkaline metal appears in part of the discharge space where the protective layer is absent. Since this alkaline metal is exposed to the discharge space, the in-dark starting characteristic can be improved. Hence a backlight unit having an excellent in-dark starting characteristic can be realized.

The stated aim can also be achieved by a liquid crystal display device including a backlight unit, the backlight unit including a plurality of fluorescent lamps having the above construction and one high-frequency electronic ballast which illuminates the plurality of fluorescent lamps.

According to this construction, the alkaline metal appears in part of the discharge space where the protective layer is absent. Since this alkaline metal is exposed to the discharge space, the in-dark starting characteristic can be improved. Hence a liquid crystal display device having an excellent in-dark starting characteristic can be realized.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIGS. 5A to 5C show a construction of the lamp according to the first embodiment, where FIG. 5A is a top view of the lamp, FIG. 5B is an enlarged longitudinal sectional view of one end of the lamp, and FIG. 5C is an enlarged cross sectional view of the lamp;

FIG. 6 shows a result of measuring the in-dark starting characteristic;

FIG. 8 is a composition diagram of the phosphor layer according to the second embodiment;

FIG. 16 shows microscope photographs of a cross section of a protective layer in an external electrode fluorescent lamp according to the third embodiment, where

FIG. 18A is a schematic view of a lamp which is a first example according to a fourth embodiment of the present invention;

FIG. 18B shows a metal member in the first example;

FIG. 26 is a schematic view of a cold cathode fluorescent lamp according to a modification.

DESCRIPTION OF THE PREFERRED EMBODIMENT(S)

Figure 1:
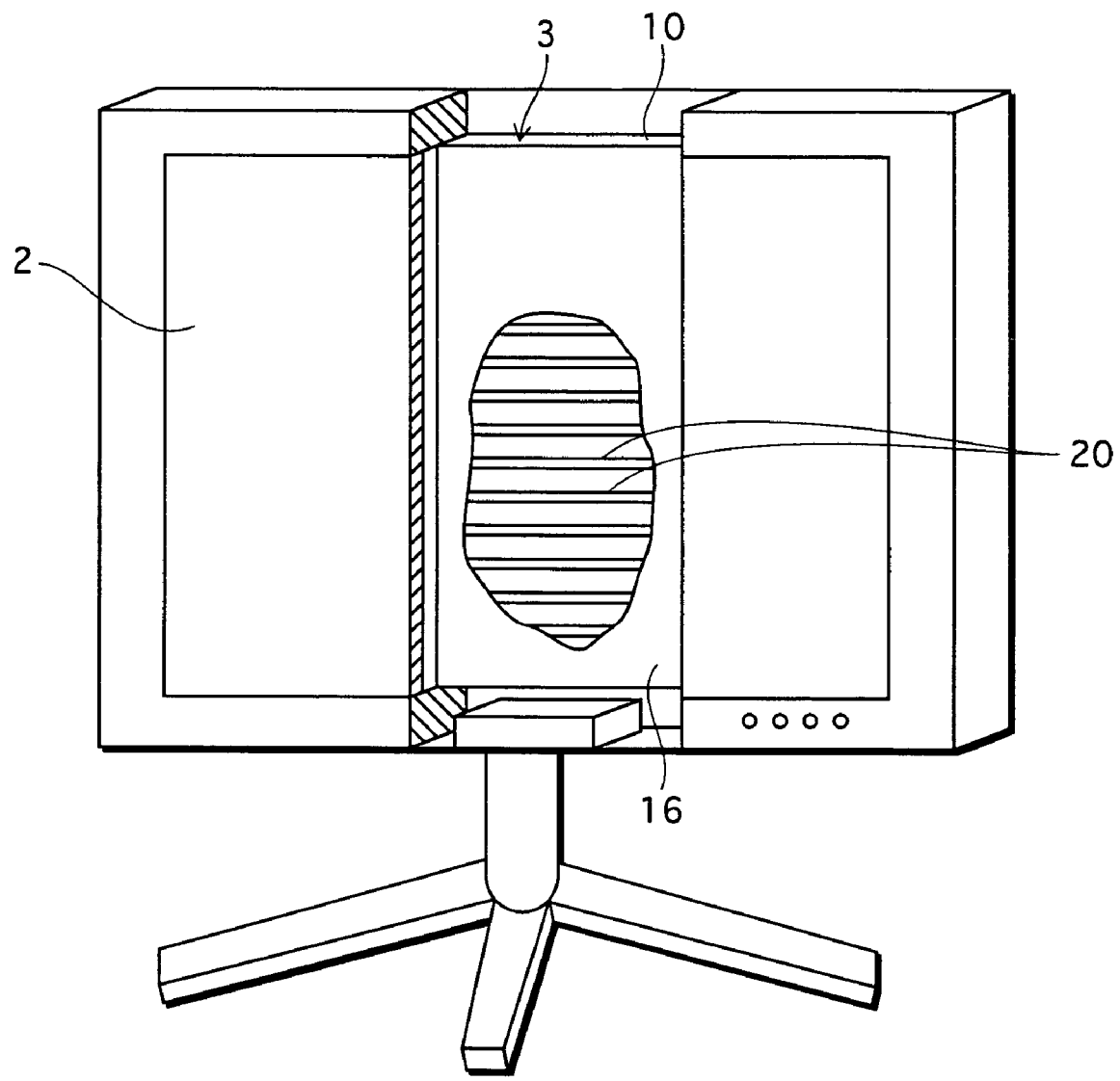
FIG. 1 shows a liquid crystal television with part of its front surface being omitted.

The following describes an application of the present invention to a liquid crystal television as one example of liquid crystal display device, with reference to the drawings. Note that these drawings are schematic views for helping understanding of constructions of a liquid crystal television, a backlight unit, and a lamp, and so dimensions and ratios shown in the drawings may differ from actual dimensions and ratios.

First Embodiment

1. Liquid Crystal Display Device

FIG. 1 shows a liquid crystal television 1, with one part of its front surface being omitted.

As shown in the drawing, the liquid crystal television 1 includes a liquid crystal display unit 2 and a backlight unit 3. The liquid crystal television 1 has a 32-inch screen size as one example.

The liquid crystal display unit 2 includes a color filter substrate, a liquid crystal, and a TFT substrate (not illustrated), and forms a color image based on an external image signal under control of a driving module (not illustrated).

The backlight unit 3 includes a plurality of fluorescent lamps 20 as a light source, and is located on the back of the liquid crystal display unit 2. The backlight unit 2 irradiates the liquid crystal display unit 2 from the rear.

2. Backlight Unit

Figure 2:
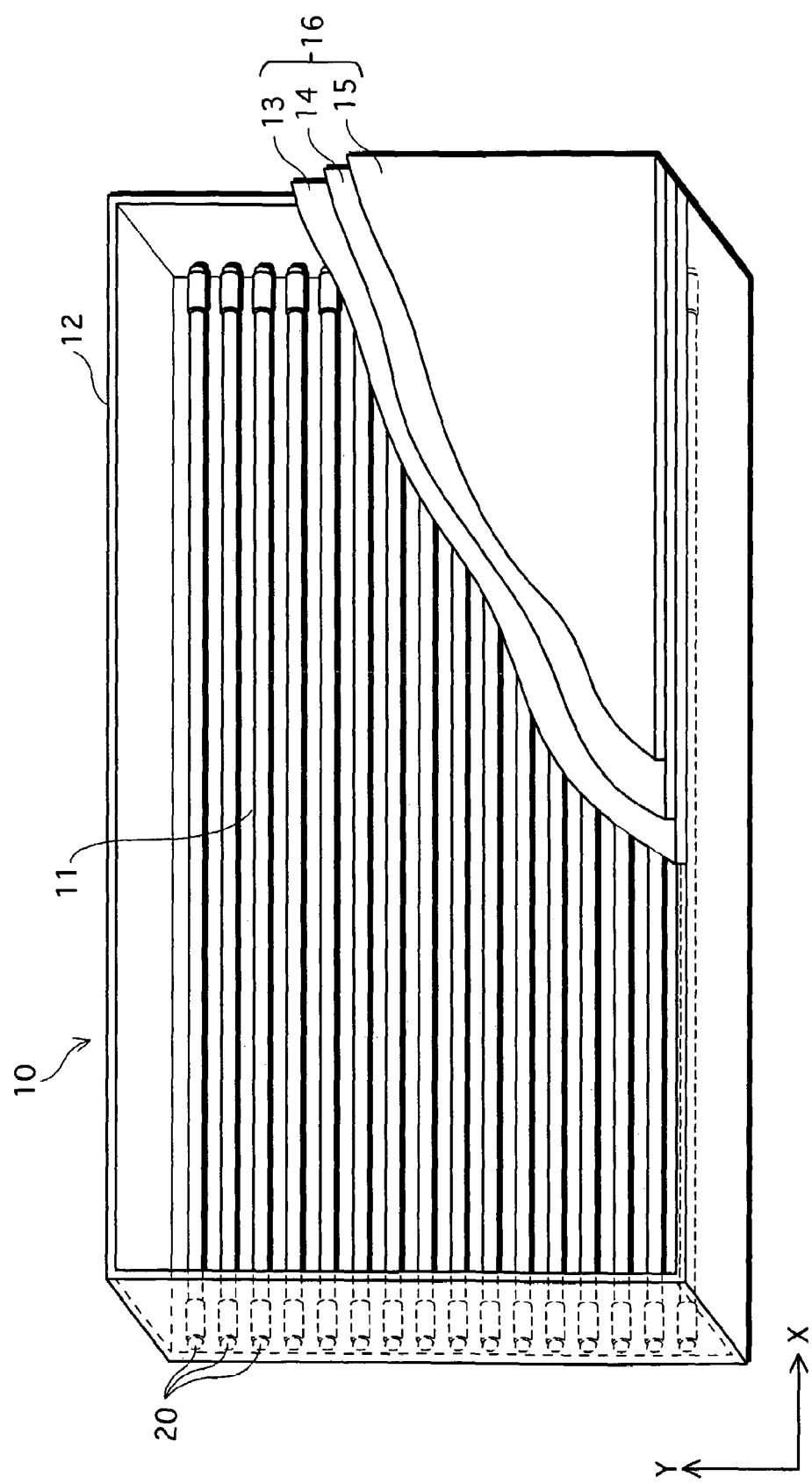
FIG. 2 is a perspective view showing a rough construction of a backlight unit for the liquid crystal television, according to a first embodiment of the present invention.

FIG. 2 is a schematic perspective view showing a construction of the backlight unit 3 used in the liquid crystal television 1, according to the first embodiment. To reveal the interior, a front panel 16 of the backlight unit 3 is partially omitted in the drawing.

Figure 3:
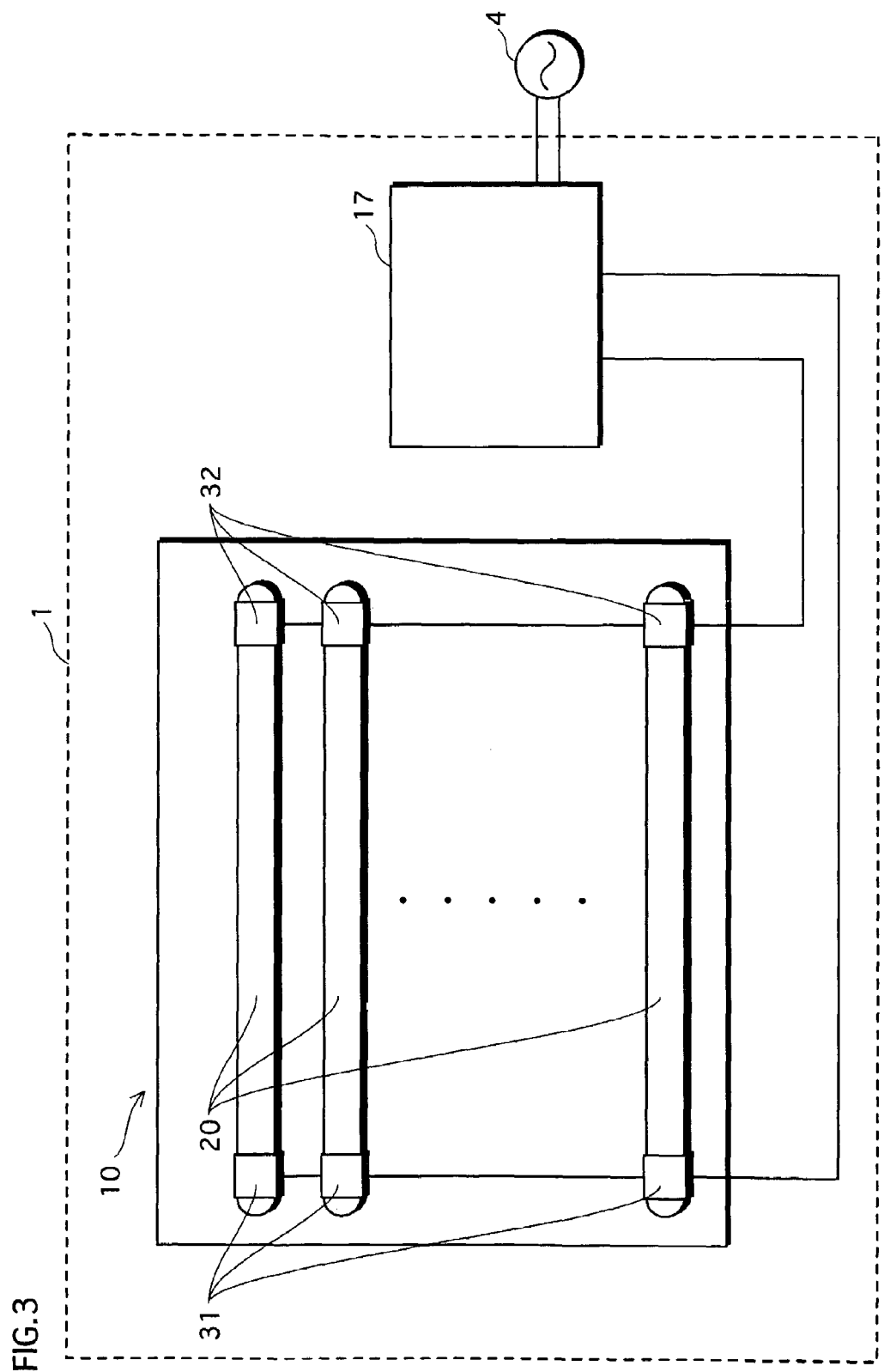
FIG. 3 is a block diagram showing the backlight unit according to the first embodiment.

FIG. 3 is a block diagram of the backlight unit 3.

The backlight unit 3 includes straight-tube fluorescent lamps 20 arranged in multiple rows such as sixteen rows with intervals in a predetermined direction (direction Y in the drawing), a housing 10 having an opening and housing these lamps 20, and the front panel 16 covering the opening of the housing 10, as shown in FIG. 2. The backlight unit 3 also includes one high-frequency electronic ballast 17 for lighting the lamps 20, as shown in FIG. 3.

In this embodiment, the high-frequency electronic ballast 17 is located outside the housing 10, as shown in FIG. 3. However, the high-frequency electronic ballast 17 may be placed inside the housing 10. As an alternative, the high-frequency electronic ballast 17 may be included not in the backlight unit 3 but in a control circuit of the liquid crystal television 1.

The housing 10 is made of a polyethylene terephthalate (PET) resin as one example. A metal such as silver is deposited on an inner surface of the housing 10 by evaporation, to form a reflection plane.

The opening of the housing 10 is covered by the front panel 16 having translucency and formed by laminating a diffusion plate 13, a diffusion sheet 14, and a lens sheet 15 in this order. Hence the housing 10 is sealed to keep foreign objects such as dust from entering.

In the front panel 16, the diffusion plate 13 and the diffusion sheet 14 scatter and diffuse light emitted from the lamps 20, whilst the lens sheet 15 aligns the light in a direction of the normal to the lens sheet 15. As a result, the light emitted from the lamps 20 is uniformly applied across an entire surface (light emitting surface) of the front panel 16.

The high-frequency electronic ballast 17 converts alternating power of 50/60 Hz supplied from a commercial power source 4 into high frequency power, and feeds the high frequency power to the lamps 20. For example, the lamps 20 operate with a lighting frequency of 40 kHz to 100 kHz and a lamp current of 3.0 mA to 8.0 mA.

The lamps 20 each use dielectric barrier discharges, and include a glass bulb 21 and external electrodes 31 and 32 formed around the glass bulb 21 at both ends (described later).

In this embodiment, the sixteen lamps 20 are electrically connected in parallel with each other through the external electrodes 31 and 32, as shown in FIG. 3.

Figure 4:
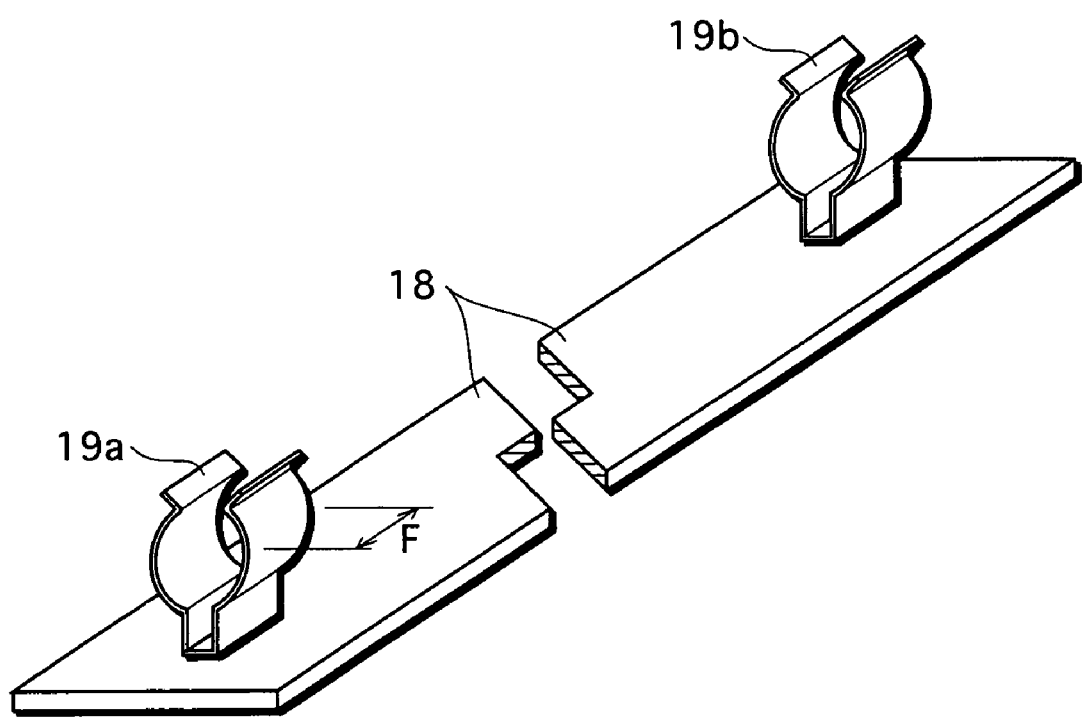
FIG. 4 shows a socket base used for mounting a lamp according to the first embodiment and supplying power to the lamp.

FIG. 4 is a schematic view of a socket base 18 used for mounting each of the sixteen lamps 20 and supplying power to the lamp 20.

The socket base 18 holds the external electrodes 31 and 32 at both ends of the lamp 20 by electrode sockets 19a and 19b made of an elastic material such as stainless steel or phosphor bronze, and illuminates the lamp 20.

A width F of a holding part of each of the electrode sockets 19a and 19b is set so as to hold the corresponding external electrode by at least 3 mm, in order to suppress a corona discharge during illumination.

In FIG. 2, the lamps 20 are arranged with their axes along a longer side of the housing 10 (direction X). Alternatively, the lamps 20 may be arranged with their axes along a shorter side of the housing 10 (direction Y).

3. Lamp Construction

FIG. 5 shows a construction of each of the lamps 20 according to this embodiment. In detail, FIG. 5A is a top view of the lamp 20, FIG. 5B is an enlarged longitudinal sectional view of one end of the lamp 20 cut along a plane including the axis of the lamp 20, and FIG. 5C is an enlarged cross sectional view of the lamp 20.

As shown in FIG. 5A, the lamp 20 includes the glass bulb 21 formed by sealing both ends of a (elliptic) cylindrical straight glass tube, and the external electrodes 31 and 32 provided around the glass bulb 21 at both ends.

The glass bulb 21 is made of soda glass containing about 3 wt % to about 20 wt %, for example 16 wt % $Na_2O$. A cross section of the glass bulb 21 cut along a plane orthogonal to the axis of the lamp 20 is substantially elliptic, as shown in FIG. 5C. The lamp 20 is housed in the housing 10 in a state where a major axis of the elliptic cross section is in parallel with the main surface of the front panel 16.

Discharge media such as mercury and a noble gas (e.g. argon or neon) are enclosed in the glass bulb 21 at a predetermined pressure. These discharge media are charged under a reduced pressure.

A protective layer 22 and a phosphor layer 23 are formed in this order on an inner surface of the glass bulb 21, as shown in FIG. 5B.

The protective layer 22 is, for instance, made of a metal oxide compound, such as yttrium oxide, or any other metal oxide compound other than a metal oxide compound that is otherwise precipitated from the glass bulb 21. The protective layer 22 is used to keep the mercury enclosed in the glass bulb 21 and the phosphor layer 23 formed on the inner surface of the glass bulb 21 from reacting with sodium ion (Na) precipitated from the glass (glass bulb 21), thereby preventing deterioration of the mercury and the phosphor layer 23. If the mercury reacts with Na ion, the mercury is consumed, which leads to a decrease in life. If the phosphor layer 23 reacts with Na ion, the phosphor layer 23 degrades, which results in lower lamp efficiency and luminance.

The phosphor layer 23 is used to convert ultraviolet light emitted from the mercury into predetermined visible light. For example, the phosphor layer 23 is composed of rare earth phosphors. Examples of rare earth phosphors include a red phosphor ($Y_2O_3$:Eu), a green phosphor ($LaPO_4$:Ce, Tb), and a blue phosphor ($BaMg_2Al_{16}O_{27}$:Eu, Mn).

As shown in FIGS. 5A and 5B, the phosphor layer 23 is formed in an area (B-B) between inner ends (B) of the external electrodes 31 and 32. For example, the phosphor layer 23 is formed in a substantially same area as a light emitting area which substantially emits visible light, or formed in a wider area that includes the light emitting area. The phosphor layer 23 is not formed in an area (A-B) corresponding to the external electrodes 31 and 32 (i.e. between an outer end (A) and inner end (B) of the external electrode).

Meanwhile, the protective layer 22 is formed in an area (A-A) between the outer ends (A) of the external electrodes 31 and 32, as shown in FIGS. 5A and 5B. The protective layer 22 is not formed in an area which is closer to a tip (outermost point) of a corresponding end of the glass bulb 21 than the outer end of each of the external electrodes 31 and 32 in a longitudinal direction of the lamp 20 (i.e. between the outer end (A) of the external electrode and the tip of the corresponding end of the lamp 20).

Sodium oxide ($Na_2O$) 24 precipitated from the soda glass of the glass bulb 21 exists in this area where the protective layer 22 is not formed. The sodium oxide 24 has a high secondary-emission coefficient. Accordingly, when the sodium oxide 24 exists on part of the inner surface of the glass bulb 21 near the external electrodes 31 and 32, secondary electrons emitted from the sodium oxide 24 encourages a discharge to occur (that is, the precipitated sodium oxide functions as an electron emissive material). As a result, the in-dark starting characteristic can be improved.

The sodium oxide 24 is obtained as a result that an alkaline metal, such as Na (sodium), contained in the glass bulb 21 is precipitated on part of the inner surface of the glass bulb 21 not occupied by the protective layer 22, when the phosphor layer 23 is baked. This precipitation occurs because Na has lower electronegativity than the other ingredients of the soda glass in the glass bulb 21. In other words, Na is precipitated on part of the inner surface of the glass bulb 21 that is exposed to a discharge space 25.

As mentioned above, Na reacts with mercury or a phosphor. The protective layer 22 is originally provided to prevent such reactions. Na which is present on part of the inner surface of the glass bulb 21 closer to the tip of the corresponding end of the glass bulb 21 than the outer end of each of the external electrodes 31 and 32 in the longitudinal direction of the lamp 20, however, hardly reacts with the mercury enclosed in the glass bulb 21 or the phosphor layer 23 formed on the inner surface of the glass bulb 21. Therefore, the absence of the protective layer 22 in this area is unlikely to cause the aforementioned degradation.

Thus, the sodium oxide 24 is formed as a result of Na being precipitated from the glass bulb 21 by heat when baking the phosphor layer 23 or when sealing the ends of the glass bulb 21.

4. In-Dark Starting Characteristic

The in-dark starting characteristic of the lamp 20 having the above construction was measured through the following experiment.

Two types of lamps given below were used in the experiment.

(a) Conventional Sample cross section: circle size: 4 mm in external diameter, 3 mm in internal diameter, 300 mm in total length material: borosilicate glass (containing 1.4 wt % Na)

other properties: no emitter (electron emissive material)

(b) Present Invention Sample cross section: ellipse size: 10.3 mm in external diameter and 9.1 mm in internal diameter of the major axis, 4.0 mm in external diameter and 2.8 mm in internal diameter of the minor axis, 300 mm in total length material: soda glass (containing 16 wt % $Na_2O$)

other properties: sodium oxide as a precipitation, no emitter

The in-dark starting characteristic of each of these two types of lamps was measured by lighting the lamp in darkness. In detail, after the lamp was left in darkness for 24 hours at a normal temperature, the lamp was lit in darkness at 0.1 lux. Here, a time (in-dark starting time) from when application of a voltage to the lamp starts to when a current flows in the lamp was measured using an oscilloscope.

FIG. 6 shows a result of the measurement.

In the "in-dark starting time" field, "unlit" indicates that the lamp was unlit even after 30 seconds. In the "evaluation" field, "x" indicates the in-dark starting time was 1 second or more, whereas "o" indicates the in-dark starting time was within 1 second. The "result" field shows a number of samples which were rated as "o" among all samples of the same type of lamp. Note here that it is preferable for any lamp to have a short in-dark starting time, irrespective of its use. For instance, a lamp used in a backlight unit of a liquid crystal television is required to have an in-dark starting time of "within 1 second", which is used as a criterion in the above experiment.

As shown in FIG. 6, one of four conventional samples (No. 4) was unlit even after 30 seconds. Also, none of the conventional samples was lit within 1 second. Accordingly, all conventional samples are rated as "x", and the result is "0/4".

This can be attributed to the following reason. In the conventional sample, no emitter is provided in the glass bulb, and the glass bulb is made of borosilicate glass. This being so, an alkaline metal is not precipitated when baking the phosphor layer, so that no substance that can act as an emitter exists in the glass bulb.

On the other hand, four present invention samples were all lit within 30 seconds. In fact, all of the four present invention samples had an in-dark starting time within 1 second. Accordingly, the result is "4/4". This is because, since the glass bulb is made of soda glass, Na is precipitated when baking the phosphor layer and this precipitated Na acts as an emitter.

The above measurement result demonstrates that, by forming the glass bulb with soda glass and conducting a phosphor layer baking step or a glass tube end sealing step, an alkaline metal is precipitated, as a result of which the in-dark starting characteristic can be improved.

Second Embodiment

In the first embodiment, the phosphor layer 23 is composed of the rare-earth phosphors that are the red phosphor ($Y_2O_3$:Eu), the green phosphor ($LaPO_4$:Ce, Tb), and the blue phosphor ($BaMg_2Al_{16}O_{27}$:Eu, Mn). However, the phosphor layer may be composed of other phosphors.

A second embodiment of the present invention describes the case where the phosphor layer is composed of phosphors other than those used in the first embodiment.

1. Structure of the Phosphor Layer

Figure 7:
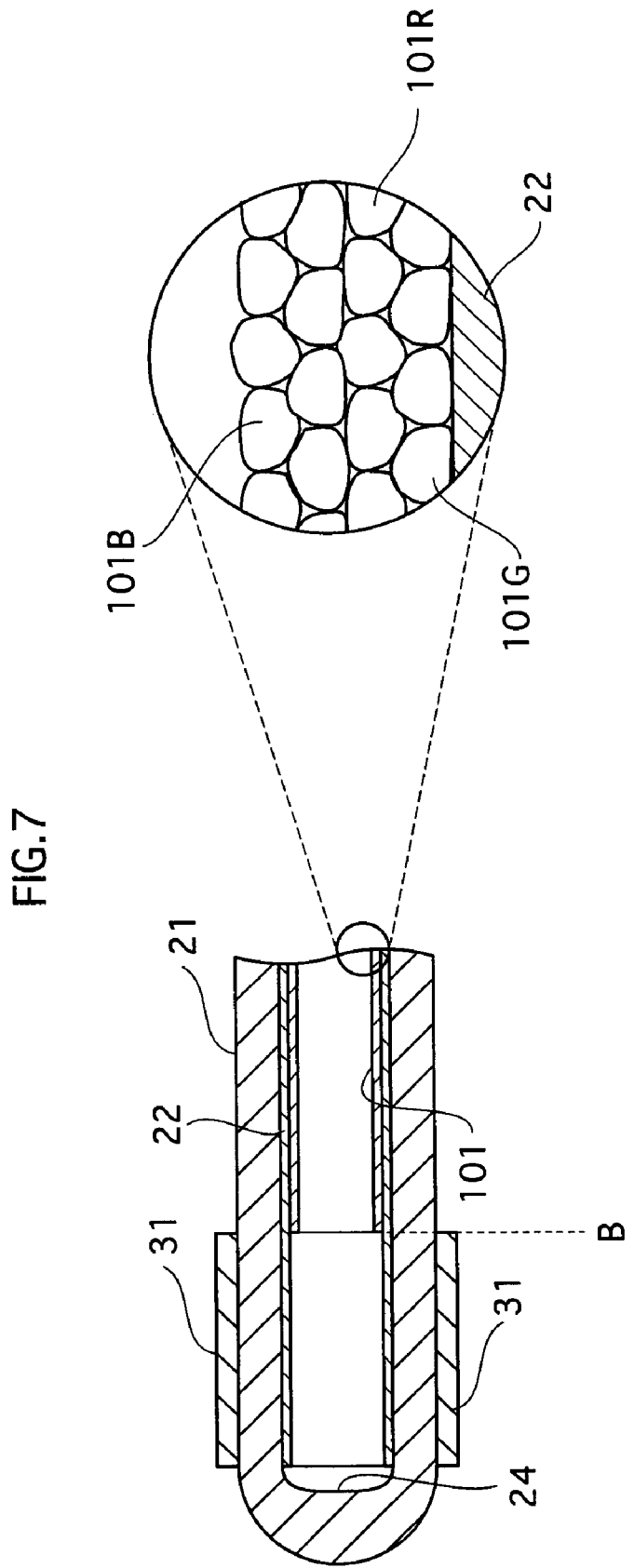
FIG. 7 is an enlarged schematic view of a phosphor layer according to a second embodiment of the present invention.

FIG. 7 is an enlarged schematic view showing a phosphor layer 101 according to the second embodiment, and FIG. 8 is a composition diagram of the phosphor layer 101.

As shown in FIGS. 7 and 8, the phosphor layer 101 is composed of $BaMg_2Al_{16}O_{27}$:Eu (BAM) as a blue phosphor 101B, $BaMg_2Al_{16}O_{27}$:$Eu^{2+}$, $Mn^{2+}$ (BAM:$Mn^{2+}$) as a green phosphor 101G, and $Y_2O_3$:$Eu^{3+}$ (YOX) as a red phosphor 101R.

The blue phosphor 101B and the green phosphor 101G are phosphors that absorb ultraviolet light of 313 nm in wavelength. A total weight proportion of the blue phosphor 101B and the green phosphor 101G in the composition is in a range of 50% to 90%.

In general, when a discharge occurs in a lamp, ultraviolet rays whose bright-line spectra have peaks at 254 nm, 313 nm, 365 nm, and the like are emitted from mercury. Part of these ultraviolet rays passes through the glass bulb and reaches the components of the backlight unit. This causes resin components of the backlight unit such as the housing to degrade and discolor, thereby decreasing transparency and translucency. As a result, surface brightness of the backlight unit drops, and the backlight unit will end up reaching its life. Particularly, ultraviolet rays of 254 nm and 313 nm in wavelength have significant influence, whereas ultraviolet rays of 365 nm in wavelength does not have such influence. Of 254-nm and 313-nm, 254-nm ultraviolet light is converted to visible light by the phosphor layer 101 and so does not have much influence.

In view of this, the two phosphors 101B and 101G which have the property of absorbing 313-nm ultraviolet light are included in the phosphor layer 101 in this embodiment. Accordingly, 313-nm ultraviolet light is reliably absorbed in the phosphor layer 101 (i.e. 313-nm ultraviolet light is kept from reaching the glass bulb 21). Thus, the leakage of 313-nm ultraviolet light from the glass bulb 21 can be prevented.

Also, since 313-nm ultraviolet light is intercepted by the phosphor layer 101 without reaching the glass bulb 21, the glass bulb 21 can be protected from solarization depending on a material of the glass bulb 21.

2. Phosphor Proportion

A desirable proportion of the phosphors for absorbing 313-nm ultraviolet light is explained below.

Figure 9:
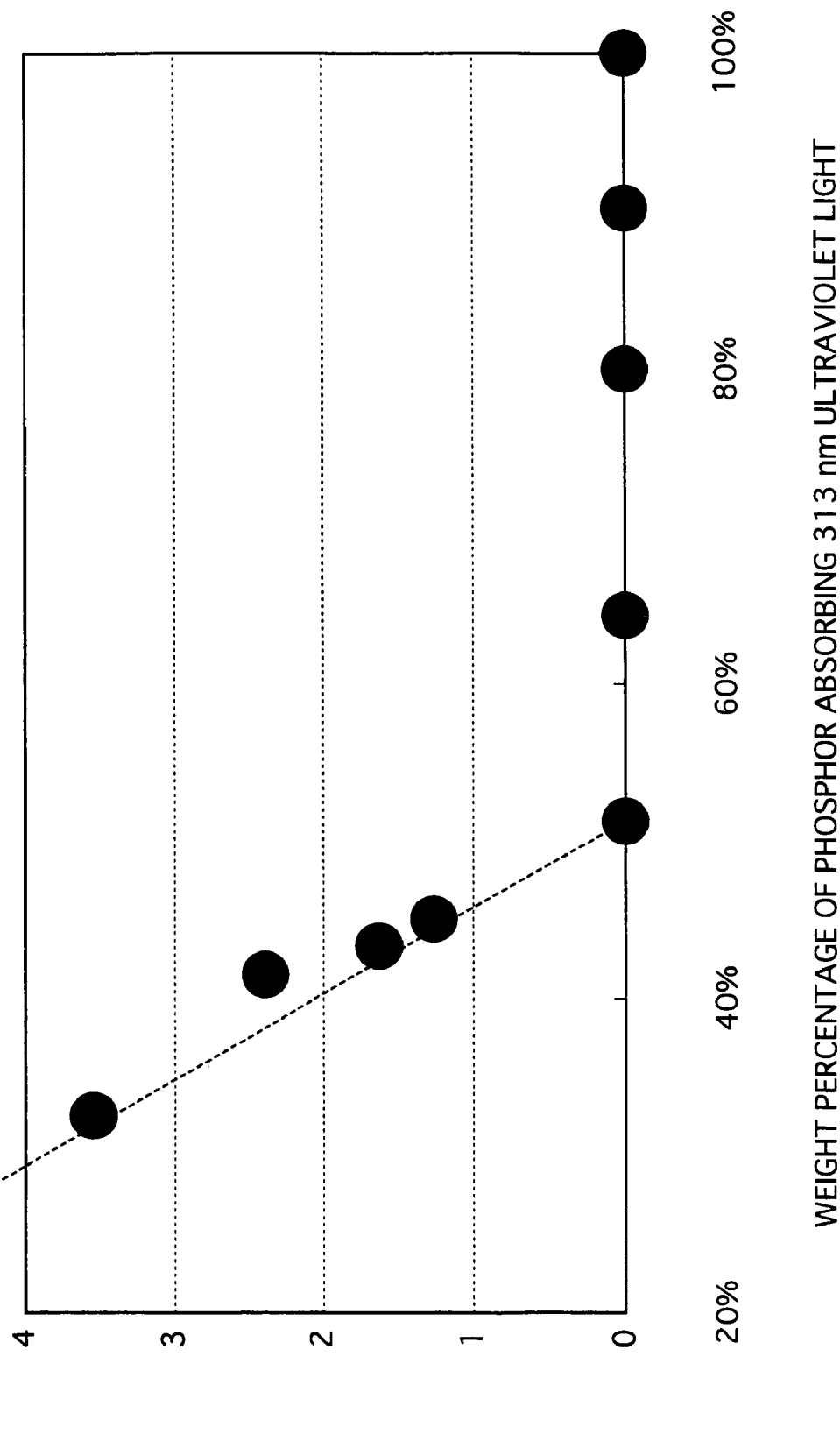
FIG. 9 shows a result of an experiment about how a weight proportion of a phosphor that absorbs 313-nm ultraviolet light in composition influences an ultraviolet interception effect.

FIG. 9 is a graph showing a result of an experiment about a relationship between the proportion of the phosphors absorbing 313-nm ultraviolet light in total weight and the aforementioned ultraviolet interception effect. In the graph, a horizontal axis represents a weight percentage of the phosphors absorbing 313-nm ultraviolet light, whilst a vertical axis represents a radiation intensity (arbitrary unit) of 313-um ultraviolet light.

The experiment used not an external electrode fluorescent lamp but a cold cathode fluorescent lamp that has electrodes inside a glass bulb (with an external diameter of 3 mm and an internal diameter of 2 mm). The cold cathode fluorescent lamp was lit with a constant current of 6 mA, and an intensity of 313-nm ultraviolet light radiated out of the cold cathode fluorescent lamp was measured at a center of the cold cathode fluorescent lamp in its longitudinal direction.

Though this experiment was conducted using a cold cathode fluorescent lamp, a similar result of 313-nm ultraviolet light absorption by the phosphor layer is expected to be obtained using an external electrode fluorescent lamp. Also, though the glass bulb is made of soda glass in the first embodiment, a similar result of 313-nm ultraviolet light absorption by the phosphor layer is expected to be obtained regardless of the type of glass.

A thickness of the phosphor layer of the cold cathode fluorescent lamp used in the experiment is 14 μm to 25 μm (a method of measuring the thickness of the phosphor layer will be explained later).

As can be understood from FIG. 9, when the weight proportion of the phosphors absorbing 313-nm ultraviolet light is higher, a greater ultraviolet interception effect is achieved. Especially when the weight proportion is 50% or more, the leakage of 313-nm ultraviolet light from the cold cathode fluorescent lamp can be suppressed almost completely.

Here, a phosphor absorbing 313-nm ultraviolet light is defined as follows. Let an intensity of an excitation wavelength spectrum around 254 nm be 100% (the excitation wavelength spectrum is a type of spectrum that plots an excitation wavelength and a light intensity when a phosphor is excited over a range of wavelengths, relative to an excitation wavelength at a maximum peak as 100). Then a phosphor absorbing 313-nm ultraviolet light has an intensity of an excitation wavelength spectrum of 313 nm at 80% or more.

Which is to say, a phosphor which absorbs 313-nm ultraviolet light is a phosphor capable of absorbing 313-nm ultraviolet light and converting it to visible light.

3. Thickness of the Phosphor Layer

A thickness of the phosphor layer 101 is preferably in a range of 14 μm to 25 μm, and more preferably in a range of 16 μm to 22-μm.

The thickness of the phosphor layer 101 referred to here is an average thickness of the phosphor layer 101 at arbitrary four positions such as 0, 90, 180, and 270 degrees from a center of a cross section of the glass bulb observed using an SEM (scanning electron microscope). Here, if a surface of the phosphor layer 101 at any of the four positions is not flat, a thickness of a thickest portion is measured.

If the thickness of the phosphor layer 101 is less than 14 μm, ultraviolet light generated in the discharge space in the glass bulb 21 is more likely to pass through the glass bulb 21 to outside without being converted to visible light, and so a sufficient visible light conversion efficiency cannot be attained. If the thickness of the phosphor layer 101 is more than 25 μm, on the other hand, light is more likely to be blocked by the phosphor layer 101, and so a necessary visible light conversion efficiency cannot be attained.

4. Phosphor Layer Formation Method

4-1. Introduction

In the second embodiment, BAM phosphors are used as the blue and green phosphors. These blue and green phosphors are generally known to have a tendency to degrade in a baking step.

In view of this, a phosphor layer formation method that can suppress the degradation of the BAM phosphors (blue and green phosphors) in a baking step is described below.

In general, a phosphor layer is formed through four steps: (A) adjusting a phosphor layer suspension; (B) applying the phosphor layer suspension to a glass bulb; (C) drying; and (D) baking.

The inventors of the present invention have learned that the degradation of the BAM phosphors in the baking step occurs for the following reason. When the baking is performed at a temperature of 300° C. to 500° C., moisture adsorbs to the phosphors, as a result of which the phosphors degrade.

Here, the moisture adhering to the phosphors can be removed to a certain extent by reheating at about 200° C. to 300° C. However, once the temperature has dropped to a room temperature or the like after the reheating, moisture may adsorb to the phosphors again. Hence this method cannot produce a sufficient effect.

The inventors of the present invention have found out that this problem can be solved by adding a carboxylate metal salt to the phosphor layer suspension so that the carboxylate metal salt adheres to the phosphors in the adjustment step (A), and causing the carboxylate metal salt, whose decomposition temperature is in a range of 300° C. to 600° C., to react with the moisture to thereby form a metal oxide in the baking step (D).

As the carboxylate metal salt, it is preferable to use yttrium caprylate, yttrium 2-ethylhexanoate, or yttrium octylate.

For example, when yttrium caprylate is used, a reaction formula showing a transition of reaction of caprylic acid Y in the above baking step is:

$$Y(C_7H_{15}COO)_3 + H_2O$$

$$\rightarrow Y-(OH)_3 + 3C_7H_{15}COOH$$

$$\rightarrow Y_2O_3 + H_2O + CO_2$$

In the baking step, yttrium caprylate absorbs moisture and thereby forms yttrium oxide, in a temperature range where moisture adsorption to the phosphors occurs. In this way, moisture adsorption to the phosphors in the baking step can be avoided. Yttrium caprylate also reacts with a part of a surface of the phosphors to which moisture tends to adhere, thereby forming an yttrium oxide coating on this part (this coating will be described later with reference to FIG. 8).

As a result, moisture is kept from reattaching to the surface of the phosphors (e.g. moisture adsorption hardly occurs even when the construction has been left in a room temperature after baking).

4-2. Example

An example of measuring a moisture residue on the phosphor layer when caprylic acid Y is used is given below.

Figure 10:
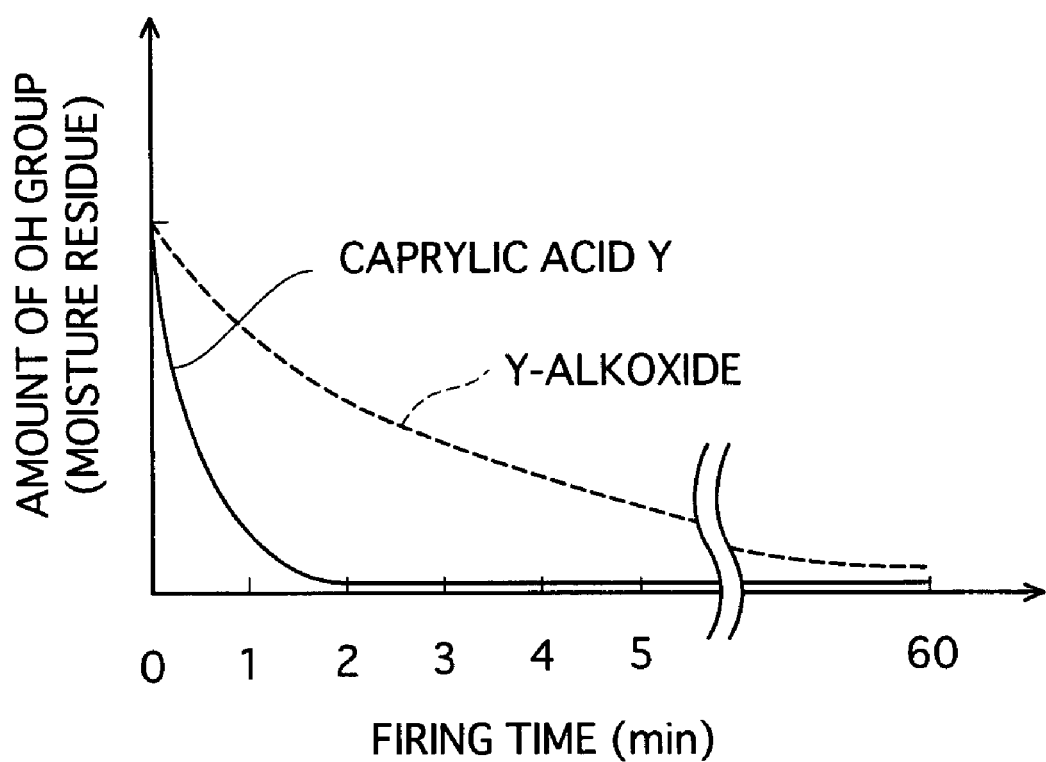
FIG. 10 is a graph showing temporal changes in OH group amount (moisture residue) during baking, according to the second embodiment.

FIG. 10 is a graph showing changes in amount of OH group (moisture residue) with time in the baking step. Caprylic acid Y is indicated by a solid line, whereas Y-alkoxide is indicated by a broken line. The moisture residue was evaluated based on absorption of light in an OH group absorption band (4300 l/cm), using an FT-IR spectrometer. Each compound was dissolved by butyl acetate, spin-coated on a silicon wafer so as to have a thickness of 0.1 μm, and dried at 100° C. for 30 minutes. After this, changes in moisture residue were observed at 550° C. which is a temperature used in the baking step.

As shown in FIG. 10, when using caprylic acid Y, moisture was removed in a very short time of a few minutes. This demonstrates that the phosphor layer formation method of the second embodiment can be effectively used in a phosphor baking step in volume production of lamps.

When using Y-alkoxide, on the other hand, moisture was not removed much. This can be attributed to the fact that yttrium (Y) which is a metal atom is attacked by the OH group in a hydrolysis reaction.

In comparison, when caprylic acid Y is used, an organic functional group which is combined with yttrium (Y) effectively acts as a steric hindrance to the OH group, thereby suppressing the reaction between yttrium and the OH group.

According to the phosphor layer formation method described above, a lamp that contains a greater amount of BAM phosphors, which are conventionally known to suffer a significant decrease in luminance maintenance rate due to Hg adsorption or the like, can exhibit a long life and a high luminance maintenance rate.

The inventors of the present invention have confirmed that the luminance maintenance rate can be improved by 5% to 10% in 3000 hours. Also, a color change (an amount of change in chromaticity x and y) in 3000 hours can be reduced to ½. Thus, a decrease in color reproducibility can be prevented even when the lamp is used for long hours.

It should be noted here that the above phosphor layer formation method can be applied not only to BAM phosphors but also to other types of phosphors and can produce similar effects.

4-3. Cross Section of the Phosphor Layer

A condition of the phosphor layer obtained after the baking step according to the above phosphor layer formation method is explained below.

Figure 11:
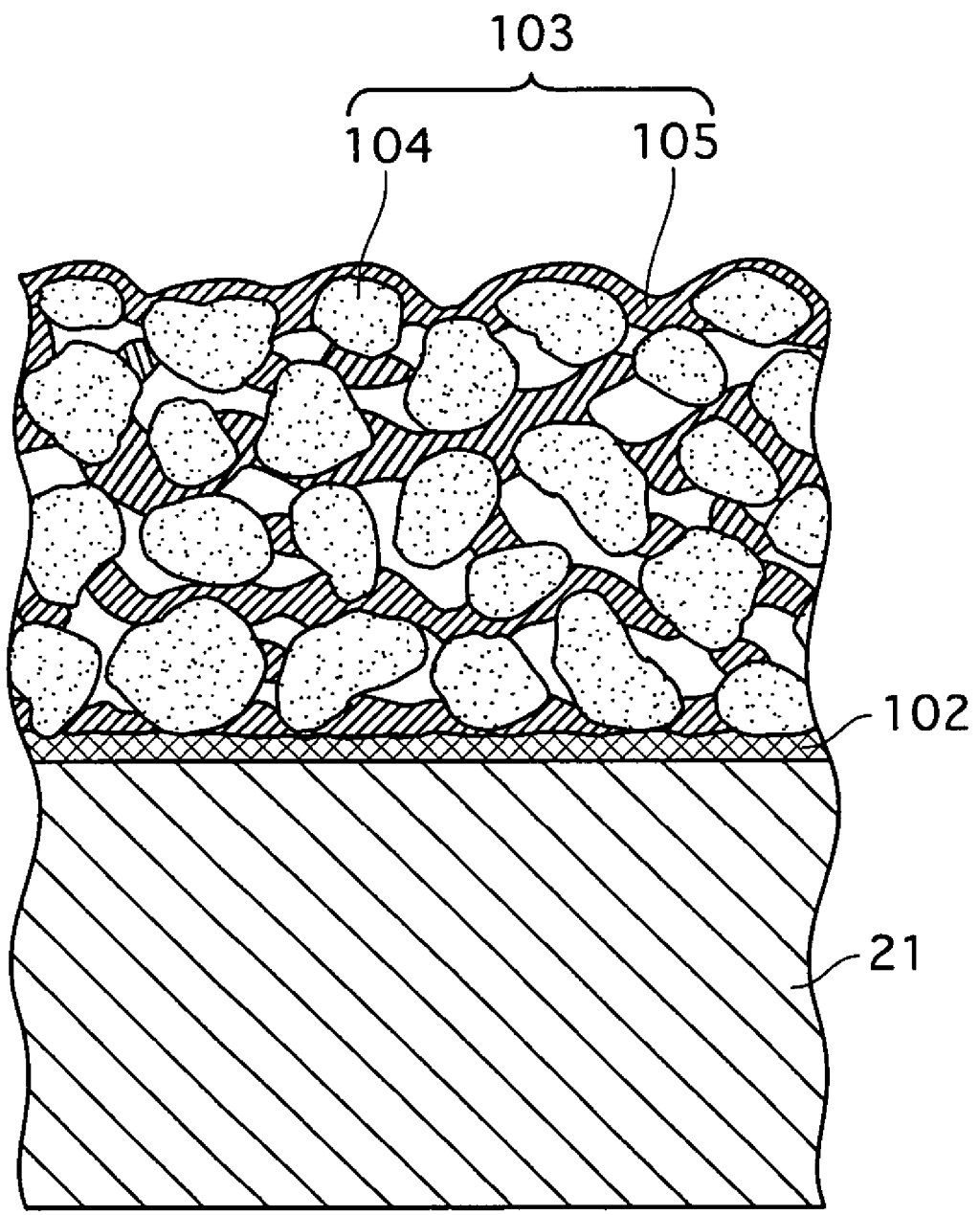
FIG. 11 schematically shows a cross section of the phosphor layer according to the second embodiment.

FIG. 11 is a schematic view showing a cross section of the phosphor layer in the second embodiment.

In the drawing, a phosphor layer 103 formed on a protective layer 102 is composed of phosphors 104 and yttrium oxide coatings 105 which are located between and on the surfaces of the phosphors 104.

The yttrium oxide coatings 105 cover the surfaces of the phosphors 104 and link adjacent phosphors 104.

The yttrium oxide coatings 105 have a function of isolating the mercury, which is enclosed in the discharge space of the glass bulb, from the phosphors 104 and the glass bulb.

This makes it possible to prevent the degradation of the phosphors 104 caused by a chemical reaction with mercury, and the consumption of the mercury in the discharge space caused by adsorption to the glass bulb.

5. Other Phosphors Absorbing 313-nm Ultraviolet Light

The second embodiment describes an example of using blue and green phosphors capable of absorbing 313-nm ultraviolet light, but a red phosphor having the same property may be used too. In detail, $Y(P, V)O_4:Eu^{3+}$ or $3.5MgO.0.5MgF_2.GeO_2(MFG):Mn^{4+}$ may be used as such a red phosphor. By using three phosphors that all have the 313-nm ultraviolet light absorbing property, the leakage of 313-nm ultraviolet light from the lamp can be prevented more effectively.

The following are examples of applicable phosphors that have the 313-nm ultraviolet light absorbing property. There is no limitation in combination of phosphors.

Blue phosphor: $Sr_{10}(PO_4)_6Cl_2:Eu^{2+}$, $Ba(Sr, Ca, Ba)_{10}(PO_4)_6Cl_2:Eu^{2+}$ Green phosphor: $MgGa_2O_4:Mn^{2+}$
$CeMgAl_{11}O_{19}:Tb^{3+}$ Red phosphor: $YVO_3:Eu^{3+}$
$YVO_4:Dy^{3+}$ Also, a mixture of phosphors of different compounds may be used for one color. One example is to use BAM for blue, LAP (not absorbing 313-nm ultraviolet light) and BAM:$Mn^{2+}$ for green, and YOX (not absorbing 313-nm ultraviolet light) and YVO for red. In such a case, by adjusting the suspension and the like such that the weight proportion of the phosphors absorbing 313-nm ultraviolet light in composition is 50% or more, the leakage of ultraviolet light from the glass bulb can be reliably prevented.

Third Embodiment

1. Structure of the Protective Layer

The first embodiment does not particularly describe a specification of the protective layer. A third embodiment of the present invention describes a protective layer that is composed of an aggregate of metal oxide particles.

Though yttrium oxide ($Y_2O_3$) is used in this protective layer, other materials such as alumina ($Al_2O_3$) may instead be used.

It is preferable for an average thickness of the protective layer to be no more than 2 μm, and a surface roughness of the protective layer to be no more than 1 μm. Alternatively, it is preferable for the average thickness of the protective layer to be no more than 2 μm, and an average cross sectional area of each closed hole in the protective layer to be no more than 0.1 μm$^2$.

2. Protective Layer Formation Method

Figure 12:
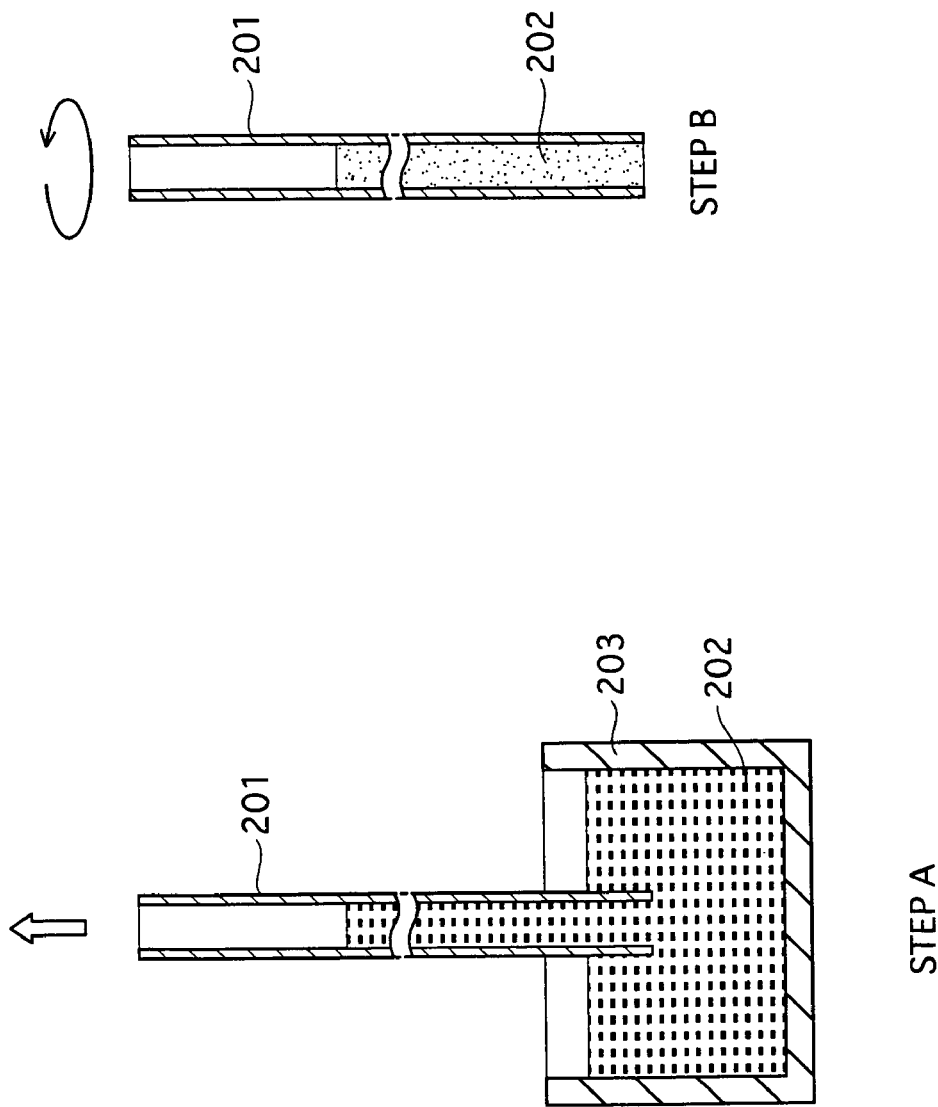
FIG. 12 shows a protective layer formation method according to a third embodiment of the present invention.

A method of forming the protective layer of the third embodiment in a lamp manufacturing process is explained below, with reference to FIG. 12.

First, a protective layer suspension 202 which contains metal oxide particles is attached to an inner surface of a glass tube 201 which is to be formed into the glass bulb (FIG. 5), in the following way.

A tank 203 containing the protective layer suspension 202 is prepared. The protective layer suspension 202 is made by adding a predetermined amount of metal oxide particles and nitrocellulose (NC) as a viscosity improver to butyl acetate as an organic solvent.

The glass tube 201 is held upright with its lower end being immersed in the protective layer suspension 202. By suction of a vacuum pump (not illustrated), air inside the glass tube 201 is exhausted through its upper end to cause a negative pressure in the glass tube 201, and the protective layer suspension 202 is pumped up (step A).

The pumping is stopped when a liquid level in the glass tube 201 is halfway to the upper end (i.e. the liquid level is at a predetermined height), and the glass tube 201 is removed from the protective layer suspension 202. As a result, the protective layer suspension 202 adheres to a predetermined area of the inner surface of the glass tube 201, in the form of a film. Here, since the protective layer suspension 202 moves downward on the inner surface of the glass tube 201 due to gravity, the thickness of the protective layer suspension 202 increases in a downward direction. This is the reason why the thickness of the protective layer differs between FIGS. 13A and 13B (described later).

Next, the glass tube 201 which has been held upright is rotated around its tube axis to dry the protective layer suspension 202 adhering to the inner surface of the glass tube 201 in the form of a film (step B). During this, each metal oxide particle is drawn toward the inner surface of the glass tube 201 by centrifugal force.

As a result, the metal oxide particles crowd on the inner surface of the glass tube 201. Hence the density of the eventual protective layer can be improved when compared with the case where no centrifugal force is used (i.e. the glass tube 201 is not rotated as in the first embodiment).

Here, the density of the eventual protective layer can be changed (adjusted) according to the number of rotations and the viscosity of the protective layer suspension 202 (the mobility of the metal oxide particles in the protective layer suspension 202). Optimal values for the number of rotations and the viscosity of the protective layer suspension 202 can be determined through a trial and error process by experiment.

3. Background of the Structure of the Protective Layer and its Effect

In the lamp having the above construction, when high frequency power (voltage) is fed (applied) to the external electrodes by the high-frequency electronic ballast, a discharge occurs in the discharge space in the glass bulb to generate ultraviolet light. The generated ultraviolet light is converted to visible light by the phosphor layer, and emitted to outside the glass bulb.

Here, suppose an alternating voltage of a high frequency and a high voltage is applied to the external electrodes using, for example, a high-frequency electronic ballast of 2.5 kV in maximum applied voltage and 60 kHz in operating frequency. In the glass bulb which is a dielectric, dielectric polarization occurs in the glass immediately below the external electrodes, and the inner surface of the glass bulb in that area acts as an electrode.

In this way, a high voltage is introduced in the glass bulb and induces a dielectric barrier discharge in the glass bulb. The dielectric barrier discharge is such a discharge that occurs in a state where the discharge space is surrounded by a dielectric (glass bulb) and the electrodes are not directly exposed to a plasma discharge.

Here, although the external electrodes are not directly exposed to a plasma discharge, part of the inner surface of the glass bulb where the external electrodes are located may be collided with mercury ions, neon ions, and argon ions (hereafter collectively called "ions"). The protective layer is formed to protect the glass bulb from such collisions.

Conventionally, most external electrode fluorescent lamps used in backlight units are lit by a driving current of about 4 mA to about 4.5 mA. If, in response to a recent demand for higher-luminance backlight units, the driving current is increased or a diameter of the glass bulb is reduced to improve luminance, a temperature of the external electrodes increases to around 140° C. This causes thermal runaway (described later), and generates pinholes in the glass bulb.

The inventors of the present invention conducted various experiments to find out the cause of this problem. Though a detailed explanation of these experiments has been omitted here, the inventors have reached a conclusion that the above phenomenon occurs because the protective layer does not sufficiently fulfill its function.

Figure 13A:
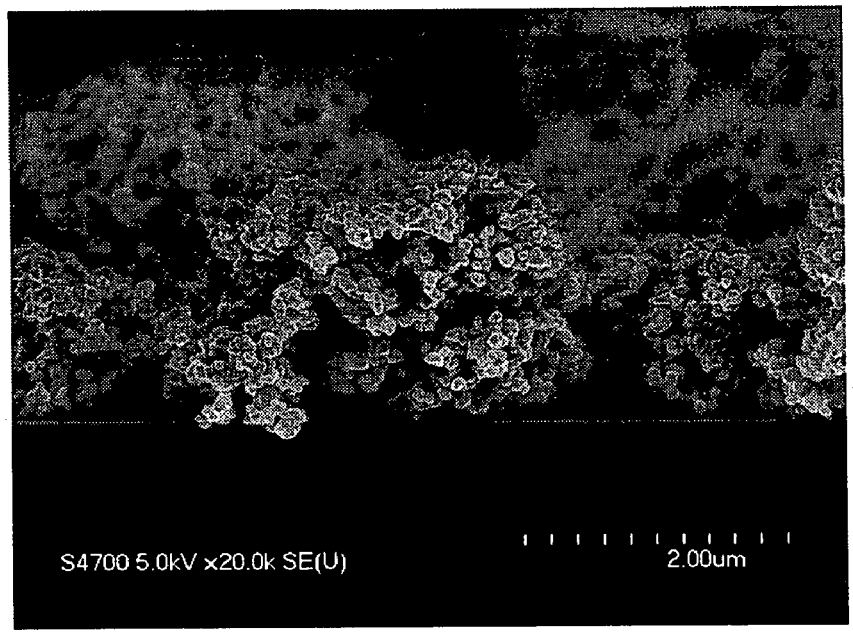
FIG. 13 shows microscope photographs of a cross section of a protective layer.
Figure 13B:

FIGS. 13A and 13B each show a microscope photograph of a cross section of a protective layer in an external electrode fluorescent lamp (hereafter referred to as a "comparative lamp") which shows the above phenomenon. FIG. 13A shows a cross section of a part of the protective layer corresponding in position to one external electrode, whereas FIG. 13B shows a cross section of a part of the protective layer corresponding in position to the other external electrode.

The protective layer is composed of an aggregate of metal oxide particles. These metal oxide particles are not necessarily packed together closely. Rather, the protective layer has open holes connected to an outer surface of the protective layer, and closed holes underneath the external surface. When these open holes and closed holes are greater in number or size, that is, when the protective layer has a lower density as in the case of FIGS. 13A and 13B, the inner surface of the glass bulb is more likely to be directly affected by collision of ions.

When the driving current is increased, the temperature of the external electrodes increases. As a result, the temperature of the glass bulb in contact with the external electrodes increases too. This causes a larger dielectric loss of glass, which leads to a further increase in temperature of the glass bulb. Besides, the temperature of the glass bulb increases due to collision of ions, too. Due to electronegativity, an energy loss and a heat value are greater if the ions collide with the glass than if the ions collide with the protective layer.

Once the temperature of the electrodes (hereafter referred to as an "electrode temperature") has reached about 140° C., thermal runaway occurs and pinholes quickly emerge in the glass bulb.

Figure 14:
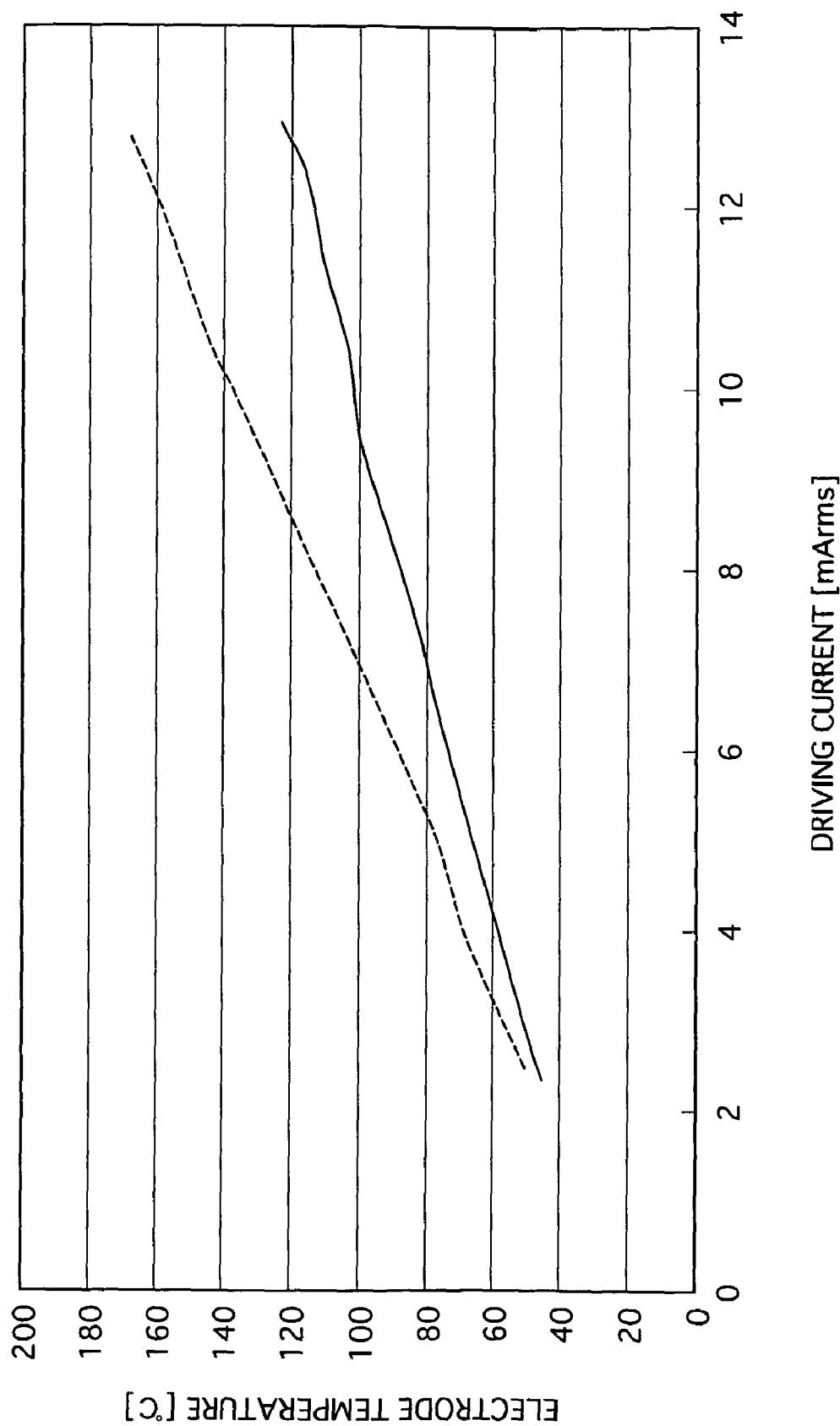
FIG. 14 shows a relationship between a driving current and an electrode temperature in a lamp according to the third embodiment.

FIG. 14 shows a relationship between the driving current and the electrode temperature in the comparative lamp. The electrode temperature is measured using a radiation thermometer. In the drawing, a broken line indicates a result of the measurement on the comparative lamp. As mentioned earlier, a driving current of about 4 mA to about 4.5 mA is conventionally used. With such a driving current, the electrode temperature is below 80° C., and pinholes caused by thermal runaway do not emerge. Nowadays, however, a driving current of about 8 mA is used in some cases. Also, a driving current of about 10 mA is expected to be used in the future. In these cases, pinholes are caused by thermal runaway.

Ions might be able to be kept from colliding with the glass bulb by increasing the thickness of the protective layer. However, when the protective layer is thicker, the lamp luminance decreases. The inventors of the present invention have learned that when the protective layer exceeds 2 μm in average thickness, the luminance drops by about 20% to about 25% when compared with the case where no protective layer is provided, which makes it impossible to obtain necessary luminance.

In view of this, the density of the protective layer is increased to suppress collision of ions against the inner surface of the glass bulb, thereby reducing the heat value in that area and suppressing pinholes. The density of the protective layer is evaluated according to the following indices.

Figure 15:
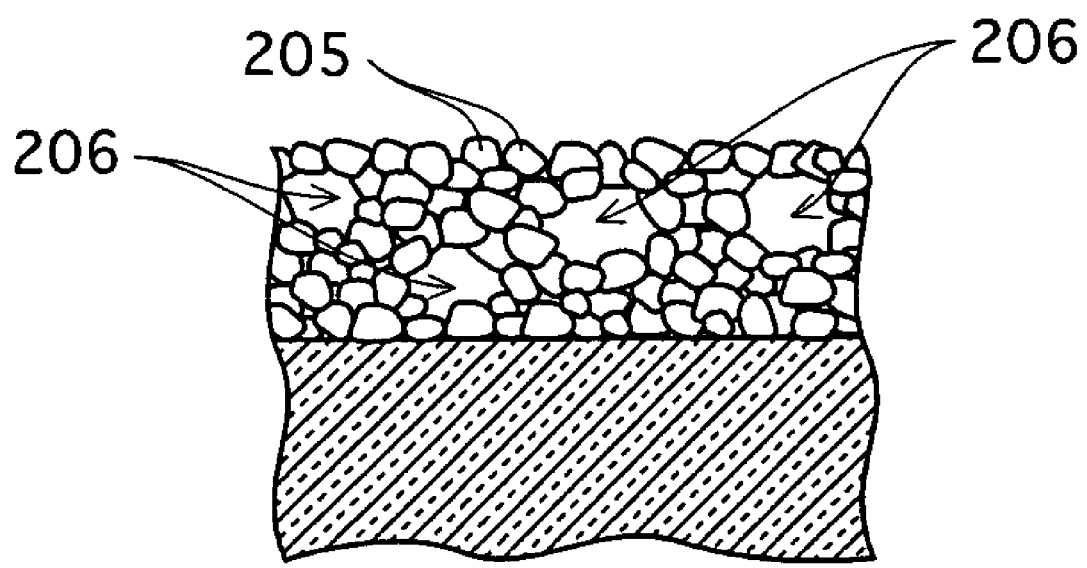
FIG. 15 schematically shows a cross section of a protective layer according to the third embodiment.

FIG. 15 is a representation of a cross section of the protective layer.

In the drawing, reference numeral 205 denotes the metal oxide particles, and reference numeral 206 denotes the closed holes.

Surface roughness in the cross section of the protective layer is measured as one index of the density of the protective layer. This is because if the surface roughness is smaller, the protective layer has smaller open holes connecting to the outer surface of the protective layer, and so has a higher density. The surface roughness referred to here is a "maximum height Ry" prescribed in JIS B 0601 (1994).

Also, an average cross sectional area of the closed holes 206 (hereafter simply referred to as a "closed hole area") in the cross section of the protective layer is measured as another index of the density of the protective layer. This is because if the closed holes 206 are smaller in size, the protective layer has a higher density.

Here, a closed hole is assumed to be a space which can contain at least one metal oxide particle of an average particle diameter in the cross section of the protective layer. Also, a closed hole need not be completely closed by a wall formed by surrounding metal oxide particles, as the wall may have a gap equivalent to a size of no more than four metal oxide particles of the average particle diameter.

Furthermore, an average number of closed holes (hereafter simply referred to as a "closed hole count") per unit area in the cross section of the protective layer is measured as another index of the density of the protective layer.

Though a detailed explanation of a result of the measurement has been omitted here, if the surface roughness does not exceed 1 μm (no more than 1 μm), the electrode temperature is about 120° C. (when the driving current is 10 mA). This is sufficiently lower than 140° C. at which the pinhole problem arises.

Also, if the closed hole area does not exceed 0.1 μm$^2$ (no more than 0.1 μm$^2$), the electrode temperature is about 120° C. (when the driving current is 10 mA). In this case, if the closed hole count does not exceed four per μm$^2$ (no more than four per μm$^2$), the electrode temperature is about 120° C. (when the driving current is 10 mA).

Figure 16A:
FIG. 16A shows a cross section (a first part) of the protective layer corresponding to one external electrode.
Figure 16B:
FIG. 16B shows a cross section (a second part) of the protective layer corresponding to the other external electrode.

FIGS. 16A and 16B each show a microscope photograph of a cross section of a protective layer in an external electrode fluorescent lamp used in this experiment (hereafter referred to as an "actual example lamp"). FIG. 16A shows a cross section of a part (hereafter a "first part") of the protective layer corresponding in position to one external electrode, whereas FIG. 16B shows a cross section of a part (hereafter a "second part") of the protective layer corresponding in position to the other external electrode.

In the actual example lamp, the first part has surface roughness of 0.05 μm, a closed hole area of 0.008 μm$^2$, and a closed hole count of 1.2 per μm$^2$, and the second part has surface roughness of 0.12 μm, a closed hole area of 0.007 μm$^2$, and a closed hole count of 3.4 per μm$^2$. An average particle diameter of metal oxide particles in the actual example lamp is 0.13 μm in the first part and 0.12 μm in the second part.

A relationship between the driving current and the electrode temperature of the actual example lamp is indicated by a solid line in FIG. 14. As can be seen from the drawing, the electrode temperature is about 104° C. even when the driving current is 10 mA, in the case of the actual example lamp. Thus, the pinhole problem caused by thermal runaway can be prevented.

It can be understood from the graph shown in FIG. 14 that, if the driving current is the same, the electrode temperature is lower in the actual example lamp than in the comparative lamp. Thus, according to the construction of the actual example lamp, the heat value of the electrodes is decreased to thereby reduce electrode dissipation, with it being possible to attain lower power consumption.

4. Other Improvements

The inventors of the present invention has developed a fluorescent lamp having an improved in-dark starting characteristic which is required especially when used as a light source of a backlight unit. To realize such a fluorescent lamp, a cesium (Cs) compound is mixed in the aforementioned protective layer suspension to form the protective layer (there is no need to perform a specific step of applying cesium (Cs)). Which is to say, a cesium (Cs) compound having low electronegativity is dispersed in the protective layer, to improve the in-dark starting characteristic.

In this example, a mixture ratio of the cesium compound in the protective layer suspension is no more than 3 wt %. This is because the protective layer suspension begins to be jellified when the mixture ratio exceeds 3 wt %, and becomes too jellified to be usable when the mixture ratio exceeds 4 wt %. Accordingly, the mixture ratio of the cesium compound in the protective layer suspension is preferably 4 wt % or less, and more preferably 3 wt % or less.

The dispersion of the cesium compound in the protective layer does not much affect the aforedescribed relationship between each of the indices (the surface roughness, the closed hole area, and the closed hole count) of the density of the protective layer and the electrode temperature. This is because the mixture ratio of the cesium compound is extremely low such as 3 wt % or less, and the cesium compound constitutes only a slight volume in the protective layer.

The inventors of the present invention conducted the following test on lamps (lamps A, B, C, and D) in which the cesium compound is dispersed in the protective layer, for measuring the in-dark starting characteristic. The inventors conducted the same test on lamp X in which the cesium compound is not dispersed in the protective layer, for the purpose of comparison.

Lamps A, B, C, D, and X basically have a same construction except for the presence or absence of the cesium compound in the protective layer and the type and mixture ratio of the cesium compound, but lamp D has an electrode width of 40 mm which is longer than that of the other lamps (20 mm).

In lamps A, B, C, and D, the type and mixture ratio (wt % in the protective layer suspension) of the cesium compound in the protective layer are as follows:

lamp A: cesium sulfate (CsSO) with a mixture ratio of 3 wt % lamp B: cesium chloride (CsCl) with a mixture ratio of 1 wt % lamp C: cesium chloride (CsCl) with a mixture ratio of 3 wt % lamp D: cesium sulfate (CsSO) with a mixture ratio of 1 wt %

For each of lamps A, B, C, D, and X, an in-dark starting rate of twenty samples was measured after 22 hours and 94 hours in darkness. The in-dark starting rate mentioned here is a percentage obtained by dividing a number of accepted samples by a total number of samples (20 in this example), where a sample is accepted only if it is lit within one second after a power supply to both external electrodes begins.

Figure 17:
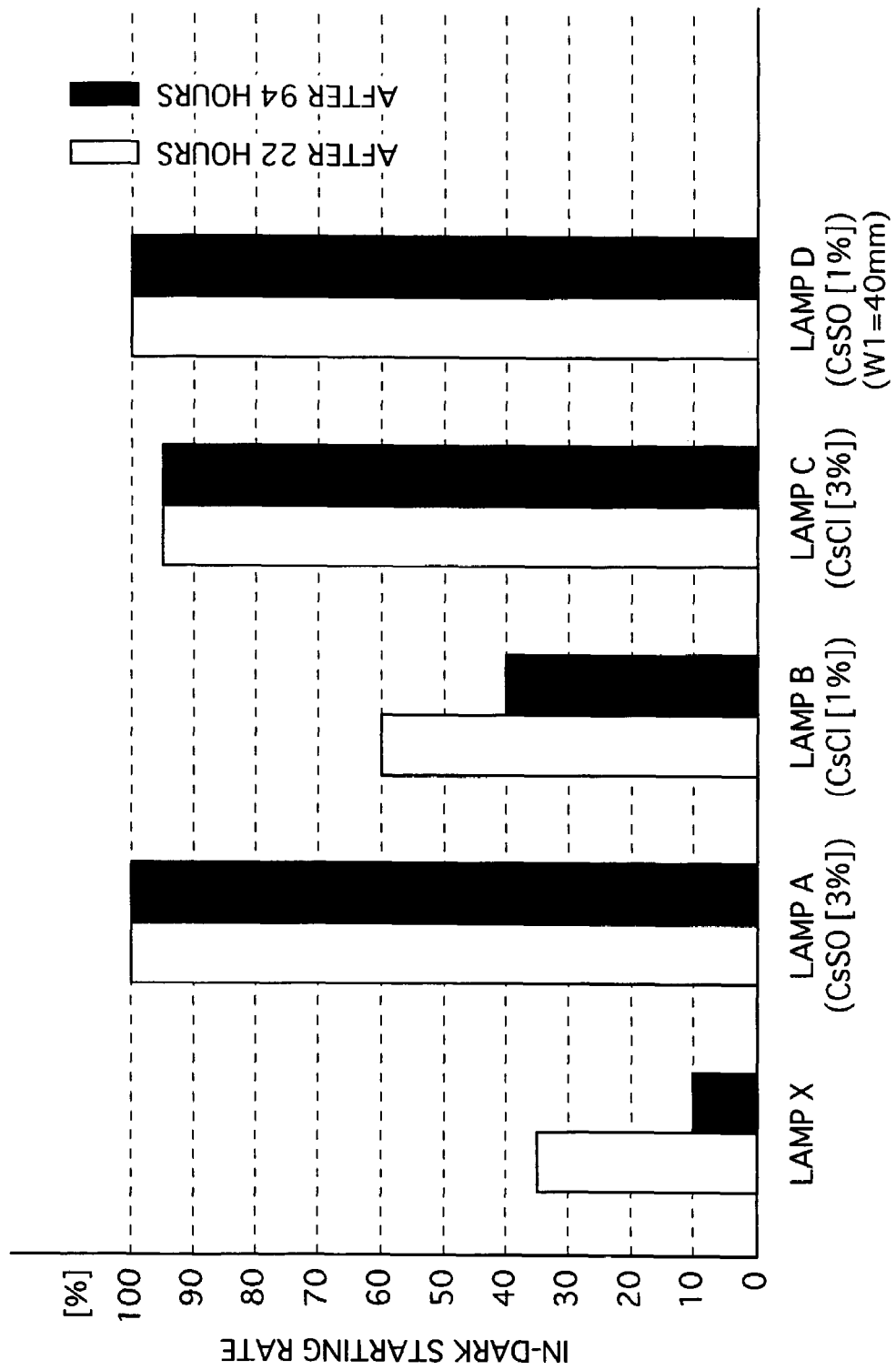
FIG. 17 shows a result of measuring an in-dark starting rate of the lamp according to the third embodiment, in both cases where the lamp is left in darkness for 22 hours and for 94 hours.

FIG. 17 shows a result of this test. In the drawing, a white bar indicates an in-dark starting rate after 22 hours in darkness, and a black bar indicates an in-dark starting rate after 94 hours in darkness.

As is clear from FIG. 17, lamps A, B, C, and D all have a higher in-dark starting rate than lamp X. In particular, lamps A and D have an in-dark starting rate of 100% in both cases of 22 hours and 94 hours. This indicates that cesium sulfate is a particularly effective cesium compound to improve the in-dark starting characteristic.

The difference in in-dark starting rate between lamps B and C can be attributed to the difference in mixture ratio. Which is to say, if the same type of cesium compound is used, then a greater mixture ratio contributes to a higher in-dark starting rate.

Also, the results of lamps A and D demonstrate that, even when the mixture ratio is small, the in-dark starting rate can be improved by increasing the electrode width.

Fourth Embodiment

The first embodiment does not specifically describe the external electrodes, but the external electrodes may be coated with a metal member. A fourth embodiment of the present invention describes a lamp in which both ends of a glass bulb are coated with a metal member.

1. First Example 1-1. Construction

FIG. 18A is a schematic view of a lamp 300 which is a first example in the fourth embodiment.

As shown in the drawing, the lamp 300 utilizes dielectric barrier discharges as in the first embodiment. The lamp 300 includes a tubular glass bulb 301 having a discharge space inside, and external electrodes 302 and 303 around both ends of the glass bulb 301. A protective layer 304 and a phosphor layer 305 are formed in this order on an inner surface of the glass bulb 301.

The glass bulb 301 is a discharge enclosure having a substantially circular cross section when cut along a plane perpendicular to a tube axis. In view of glass workability, the glass bulb 301 is preferably made of a glass material with a sodium oxide content in a range of 3 wt % to 20 wt %.

In view of the in-dark starting characteristic, the glass bulb 301 is preferably made of a glass material with a sodium oxide content in a range of 5 wt % to 20 wt %. Note here that the glass material is not limited to soda glass. If the sodium oxide content is 5 wt % or more, an in-dark starting time of about one second or less can be achieved. Conversely, if the sodium oxide content exceeds 20 wt %, the glass bulb 301 may be tinted which causes a luminance drop or the strength of the glass bulb 301 may decrease as a result of long hours of use.

Also, in view of environmental protection, it is preferable to use glass that contains the above range of alkaline metal and no more than 0.1 wt % lead (i.e. "lead free glass"). It is more preferable if the glass contains no more than 0.01 wt % lead.

In this example, the glass bulb 301 is a straight glass bulb made of soda glass which contains 16 wt % sodium oxide, and has an external diameter ø of 4.0 mm, an internal diameter ø of 3.0 mm, and a total length of 720 mm. A noble gas 306 such as argon and neon at a pressure of about 8 kPa and about 2 mg mercury 307 are enclosed in the glass bulb 301. Though the size of the glass bulb 301 is not limited to the above, the glass bulb 301 is preferably 1.8 mm to 6.0 mm in external diameter (1.4 mm to 5.0 mm in internal diameter) to maintain slimness.

The external electrodes 302 and 303 are respectively composed of electrode body layers 308 and 309 and cap-like metal members 310 and 311. The electrode body layers 308 and 309 are each a conductive layer formed around a corresponding end of the glass bulb 301. The metal members 310 and 311 are each connected to a corresponding electrode body layer in a state of covering at least one part of an outer surface of the electrode body layer. The metal members 310 and 311 are made of a material, such as copper, that has high electric conductivity and a similar thermal expansion coefficient to the glass bulb 301.

Each of ends 310a and 311a of the respective metal members 310 and 311 is a length L such as 1 mm away from a corresponding one of ends 308a and 309a of the electrode body layers 308 and 309, toward a tip of a corresponding end 301a of the glass bulb 301. Each of the external electrodes 302 and 303 is about 20 mm wide in its cylindrical part, and is formed around an entire circumference of the glass bulb 301.

The protective layer 304 is formed by an aggregate of metal oxide particles of yttrium oxide ($Y_2O_3$), magnesium oxide (MgO), or lanthanum oxide ($La_2O_3$) which is an electron emissive material with a maximum thickness of 0.5 μm (no more than 0.2 μm in surface roughness) to 2 μm (no more than 1 μm in surface roughness). In the first example, the protective layer 304 is composed of an aggregate of metal oxide particles of 0.01 μm to 0.1 μm $Y_2O_3$ with a maximum thickness of 2 μm and a surface roughness of no more than 1 μm.

If the protective layer 304 has a maximum thickness of 2 μm and a surface roughness of more than 1 μm, the luminance drops by about 20% when compared with the case where no protective layer is provided, so that necessary luminance cannot be attained. If the protective layer 304 has a maximum thickness of 0.5 μm and a surface roughness of more than 0.2 μm, the density of the protective layer 304 decreases. In this case, when the driving current is increased to 5 mA or more to improve the luminance, part of the inner surface of the glass bulb 301 corresponding in position to the external electrodes 302 and 303 is exposed to collision of argon ions and mercury ions, which causes the inner surface to be eroded and perforated (with pinholes).

An inner surface 301b of the end 301a of the glass bulb 301 has an area where the protective layer 304 is absent. When sealing the end 301a of the glass bulb 301, an alkaline metal such as Na which is precipitated from the glass material appears in this area. As a result, the alkaline metal such as Na and the metal oxide compound such as yttrium oxide, which are electron emissive materials, are exposed to the discharge space. Hence the in-dark starting characteristic can be improved. Note here that the surface roughness of the protective layer 304 is a "maximum height Ry" prescribed in JIS B 0601 (1994).

The protective layer 304 is provided to prevent the mercury 307 enclosed in the glass bulb 301 and the phosphor layer 305 formed on the inner surface of the glass bulb 301, from reacting with Na precipitated from the glass and thereby deteriorating. If the mercury 307 reacts with Na, the mercury 307 is consumed and the lamp life is shortened. If the phosphor layer 305 reacts with Na, the phosphor layer 305 degrades, which results in lower lamp efficiency and luminance.

Also, a protective layer 304a is provided on part of the inner surface of the glass bulb 301 corresponding in position to the external electrode 302 as one example. This protective layer 304a can be formed by removing the protective layer 304 and the phosphor layer 305 from this part of the inner surface, and then coating it with a metal oxide compound of yttrium oxide in which an electron emissive material such as a cesium compound, a lithium compound, or a barium compound is dispersed.

In this example, a cesium compound is dispersed in yttrium oxide. To keep the cesium compound from scattering in the glass bulb 301, an inner end of the protective layer 304a is an interval M away from the end 308a of the electrode body layer 308 (the end of the external electrode 302), toward a tip of the end 301a of the glass bulb 301. The interval M is desirably more than 2 mm.

As a result, the cesium compound having high electron emissivity is exposed to the discharge space, with it being possible to further improve the in-dark starting characteristic.

Even if atoms are liberated from the electron emissive material due to a discharge and scatter in the glass bulb 301, the electron emissive material is located at the interval M (more than 2 mm) from the end 308a of the electrode body layer 308 (or from the light emitting area), so that the liberated atoms are unlikely to adhere to the phosphor layer 305 in the light emitting area. Hence a decrease in luminous flux caused by atoms liberated during lamp operation can be avoided.

The means for preventing the cesium compound from scattering in the glass bulb 301 is not limited to the above. For instance, the cesium compound may be linked together with noncrystalline yttrium oxide to form a continuous film, using a sol-gel method. By binding the cesium compound using yttrium oxide, the cesium compound can be kept from scattering into the glass bulb 301.

The phosphor layer 305 includes at least a phosphor containing Mg, and is located on the inner surface of the glass bulb 301 between the inner ends of the external electrodes 302 and 303 (P-P in the drawing). In the first example, a rare-earth phosphor which is a mixture of a red phosphor ($Y_2O_3$:$Eu^{3+}$), a green phosphor ($LaPO_4$:$Ce^{3+}$, $Tb^{3+}$), and a blue phosphor ($BaMg_2Al_{16}O_{27}$:$Eu^{2+}$) which contains Mg is applied to form the phosphor layer 305 of about 20 μm in thickness.

FIG. 18B shows a shape of the metal member 310 in the first example.

The metal member 311 is identical to the metal member 310. The metal member 310 is shaped like a cylinder one end of which is covered with a dome. To make the metal member 310 elastic, two slits 312 are formed in a longitudinal direction of the metal member 310 as one example. With the use of the elasticity given by the slits 312, the metal member 310 is connected to the electrode body layer 308.

The metal members 310 and 311 are attached respectively to the electrode body layers 308 and 309 from the ends of the glass bulb 301. The ends 310a and 311a of the metal members 310 and 311 are chamfered so as not to have sharp edges, as shown in FIG. 18A. Accordingly, the metal members 310 and 311 can be easily attached to the electrode body layers 308 and 309 from the ends of the glass bulb 301, without damaging outer surfaces of the electrode body layer 308 and 309.

To suppress damage to the outer surfaces of the electrode body layers 308 and 309, each of the metal members 310 and 311 is preferably not a plastic metal member, such as metal foil or metal tape, that does not have a definite shape, is easily deformed by an external force, and remains deformed even after the force is removed. Rather, each of the metal members 310 and 311 is preferably a metal member which has a definite shape and is not easily deformed by an external force.

In the first example, the metal members 310 and 311 are, for instance, 23.0 mm in total length, 4.5 mm in external diameter ø of the cylinder, 4.1 mm in internal diameter ø of the cylinder, and 0.2 mm in wall thickness. Since the metal members 310 and 311 need not have plasticity unlike metal foil or metal tape, the metal members 310 and 311 can be made relatively thick so as to resist scratches.

Since the external diameter ø of the glass bulb 301 is 4.0 mm and the internal diameter ø of the metal members 310 and 311 is 4.1 mm, a gap between the glass bulb 301 and the metal members 310 and 311 is 0.05 mm on average.

The electrode body layers 308 and 309 are formed by applying a conductive paste, such as a sliver paste, to the sealed ends of the glass bulb 301 using a known dip method so as to have a predetermined total length such as 25.0 mm from the tips of the ends of the glass bulb 301.

The conductive paste used for the electrode body layers 308 and 309 is not limited to a sliver paste. For example, a nickel paste, a gold paste, a copper paste, or a carbon paste may instead be used. With the use of these pastes, the adhesion with the glass bulb 301 increases. As a result, a corona discharge between the glass bulb 301 and the electrode body layers 308 and 309 can be suppressed. Also, capacitances of a first capacitor and a second capacitor, which are equivalently formed by the electrode body layers 308 and 309 and the glass bulb 301 located between the discharge space and the electrode body layers 308 and 309, can be made substantially equal to each other. Also, the conductive paste used for the electrode body layers 308 and 309 preferably contains a low melting point glass as a binder to achieve strong adhesion with the glass bulb 301. The low melting point glass is preferably 1 wt % to 10 wt % in content, and no more than $10^{-6}$ Ω-cm in specific resistance.

1-2. Effects

The effects of the above external electrode discharge lamp 300 are explained below.

In the first example, the alkaline metal such as Na is present on the inner surface 301b of the glass bulb 301 where the protective layer 304 is not formed. The alkaline metal in this area is exposed to the discharge space, with it being possible to improve the in-dark starting characteristic (as in the first embodiment). In addition, the protective layer 304a (304) corresponding in position to the external electrode 302 contains the electron emissive material such as $Y_2O_3$, so that the in-dark starting characteristic can be further improved.

Also, the protective layer 304a (304) is formed from the electron emissive material such as $Y_2O_3$ with a maximum thickness of 2 μm. Since the maximum thickness of the protective layer 304a (304) is no more than 2 μm, a decrease in luminous flux can be prevented. Also, the maximum thickness of the protective layer 304 is 0.5 μm or more. Accordingly, even when the driving current is increased to 5 mA or more to achieve higher luminance, the problem that the inner surface of the glass bulb 301 corresponding in position to the external electrode 302 is eroded and perforated (with pinholes) due to collision of argon ions or mercury ions can be prevented.

The alkaline metal such as Na is precipitated from the glass bulb 301 by heat. This can be done by using heat when baking the phosphor layer 305 or when sealing the ends of the glass bulb 301, with there being no need to perform a specific heating step for precipitating the alkaline metal.

Also, the protective layer 304a which corresponds in position to at least the external electrode 302 among the external electrodes 302 and 303 contains an electron emissive material, such as a cesium compound, a lithium compound, or a barium compound, that has a high secondary-emission coefficient. This further enhances the in-dark starting characteristic.

Also, the phosphor layer 305 includes a phosphor that contains an electron emissive material such as Mg, and is located on the inner surface of the glass bulb 301 between the inner ends of the external electrodes 302 and 303. This further enhances the in-dark starting characteristic.

Also, the protective layer 304a which contains the electron emissive material such as a cesium compound is located at a sufficient distance from the light emitting area. Accordingly, even if atoms are liberated from the electron emissive material and scatter in the glass bulb 301 due to a discharge, the liberated atoms will not adhere to the phosphor layer 305 in the light emitting area. Hence a decrease in luminous flux during lamp life can be prevented.

Also, the ends 310a and 311a of the metal members 310 and 311 are the interval L of at least 1 mm away from the ends 308a and 309a of the electrode body layers 308 and 309, toward the tips of the ends of the glass bulb 301. This has the effect of suppressing a corona discharge during lamp operation. Accordingly, a fluorescent lamp, a backlight unit, and a liquid crystal television having external electrodes which are as long-lived as the other components can be realized.

This is explained in more detail below. Conventionally, a gap h may be present between the glass bulb 301 and the metal members 310 and 311 due to an installation error of the metal members 310 and 311 in the tube axis direction, as shown by dashed lines in FIG. 18A. In this example, on the other hand, there is no gap between the glass bulb 301 and the metal members 310 and 311, so that a corona discharge is suppressed and the generation of ozone is reduced.

Also, the metal members 310 and 311 surround the electrode body layers 308 and 309 with a length of 3 mm or more. Accordingly, the lamp 300 can be lit stably with these metal members 310 and 311 at both ends of the lamp 300 being securely held by the electrode sockets (18) in the socket base such as the one shown in FIG. 4.

Also, the ends 310a and 311a of the metal members 310 and 311 are chamfered so as not to have sharp edges. This makes it easier to attach the metal members 310 and 311 from the ends of the glass bulb 301, without damaging the outer surfaces of the electrode body layers 308 and 309.

Also, the metal members 310 and 311 are connected to the electrode body layers 308 and 309 through the use of the elasticity of the two or more slits 312 formed in its longitudinal direction. This makes it easier to attach the metal members 310 and 311 from the ends of the glass bulb 301, without damaging the outer surfaces of the electrode body layers 308 and 309.

Also, the conductive layers as the electrode body layers 308 and 309 are formed from a silver paste. This increases the adhesion with the glass bulb 301. As a result, a corona discharge between the glass bulb 301 and the electrode body layers 308 and 309 can be suppressed. Also, capacitances of a first capacitor and a second capacitor, which are equivalently formed by the electrode body layers 308 and 309 and the glass bulb 301 located between the discharge space and the electrode body layers 308 and 309, can be made substantially equal to each other.

Also, the conductive paste used for the electrode body layers 308 and 309 contains 1 wt % to 10 wt % low melting point glass. This strengthens the adhesion of the electrode body layers 308 and 309 to the glass bulb 301. As a result, the electrode body layers 308 and 309 are kept from peeling away from the glass bulb 301 when attaching the metal members 310 and 311 to the electrode body layers 308 and 309.

2. Second Example 2-1. Construction

Figure 19:
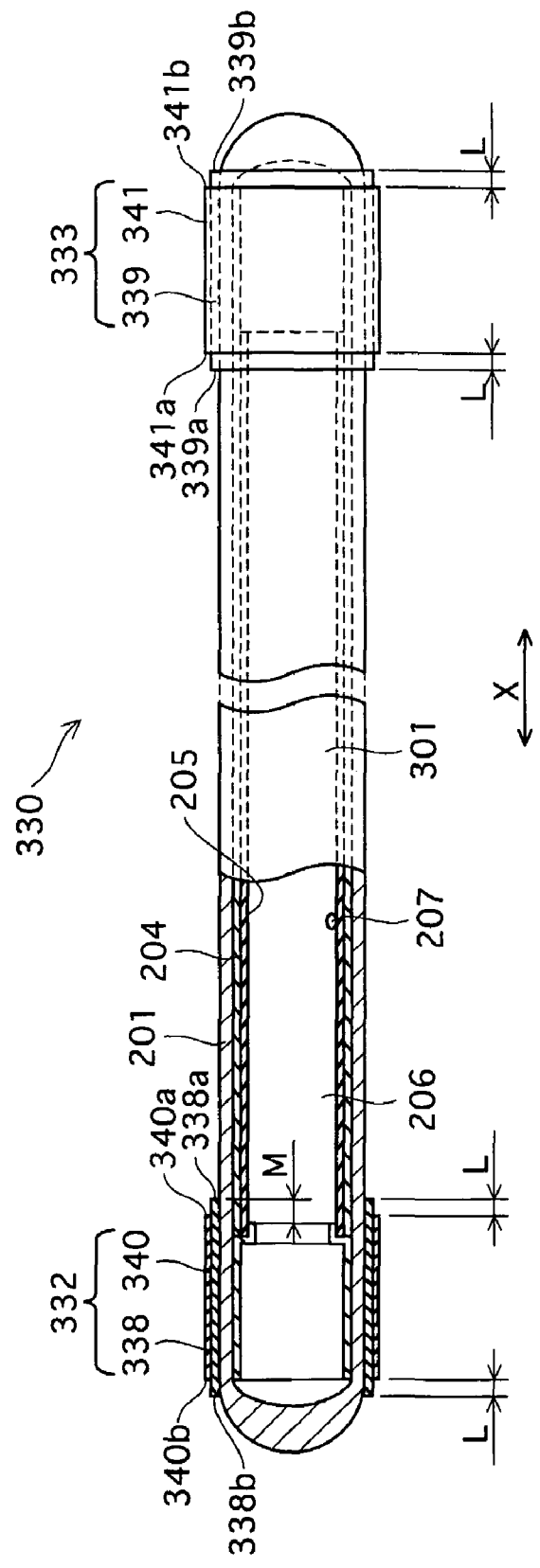
FIG. 19 is a schematic view of a lamp which is a second example according to the fourth embodiment.

FIG. 19 is a schematic view of a lamp 330 which is a second example in the fourth embodiment. In FIG. 19, components which are the same as those in the lamp 300 of the first example have been given the same reference numerals and their explanation has been omitted.

The second example differs from the first example in the following. External electrodes 332 and 333 are composed respectively of electrode body layers 338 and 339 and metal members 340 and 341. The electrode body layers 338 and 339 are formed like a cylinder, by applying a silver paste around both ends of the glass bulb 301 according to a dip method with the tips of the ends of the glass bulb 301 being masked as one example. The metal members 340 and 341 are formed like a sleeve (cylinder), and attached and connected to the electrode body layers 338 and 339 from the ends of the glass bulb 301 by shrinkage fitting. Here, both ends 340a and 340b of the sleeve metal member 340 (or both ends 341a and 341b of the sleeve metal member 341) are respectively located inner than both ends 338a and 338b of the electrode body layer 338 (or both ends 339a and 339b of the electrode body layer 339), by an interval L.

According to this example, the aforementioned gap is not present between the glass bulb 301 and the metal members 340 and 341. Therefore, a corona discharge between the glass bulb 301 and the metal members 340 and 341 during lamp operation can be suppressed. Hence a fluorescent lamp, a backlight unit, and a liquid crystal television having external electrodes which are as long-lived as the other components can be realized.

Also, both ends 340a and 340b of the metal member 340 (or both ends 341a and 341b of the metal member 341) have the interval L from both ends 338a and 338b of the electrode body layer 338 (or both ends 339a and 339b of the electrode body layer 339), even if there is an installation error in the tube axis direction X. Accordingly, a corona discharge between the glass bulb 301 and the ends 340a and 340b of the metal member 340 (or the ends 341a and 341b of the metal member 341) during lamp operation can be suppressed.

Also, since the cylindrical metal members 340 and 341 are connected to the electrode body layers 338 and 339 by shrinkage fitting or the like, the metal members 340 and 341 are firmly fixed to the electrode body layers 339 and 339, which contributes to stable electrical connection.

3. Third Example

Figure 20:
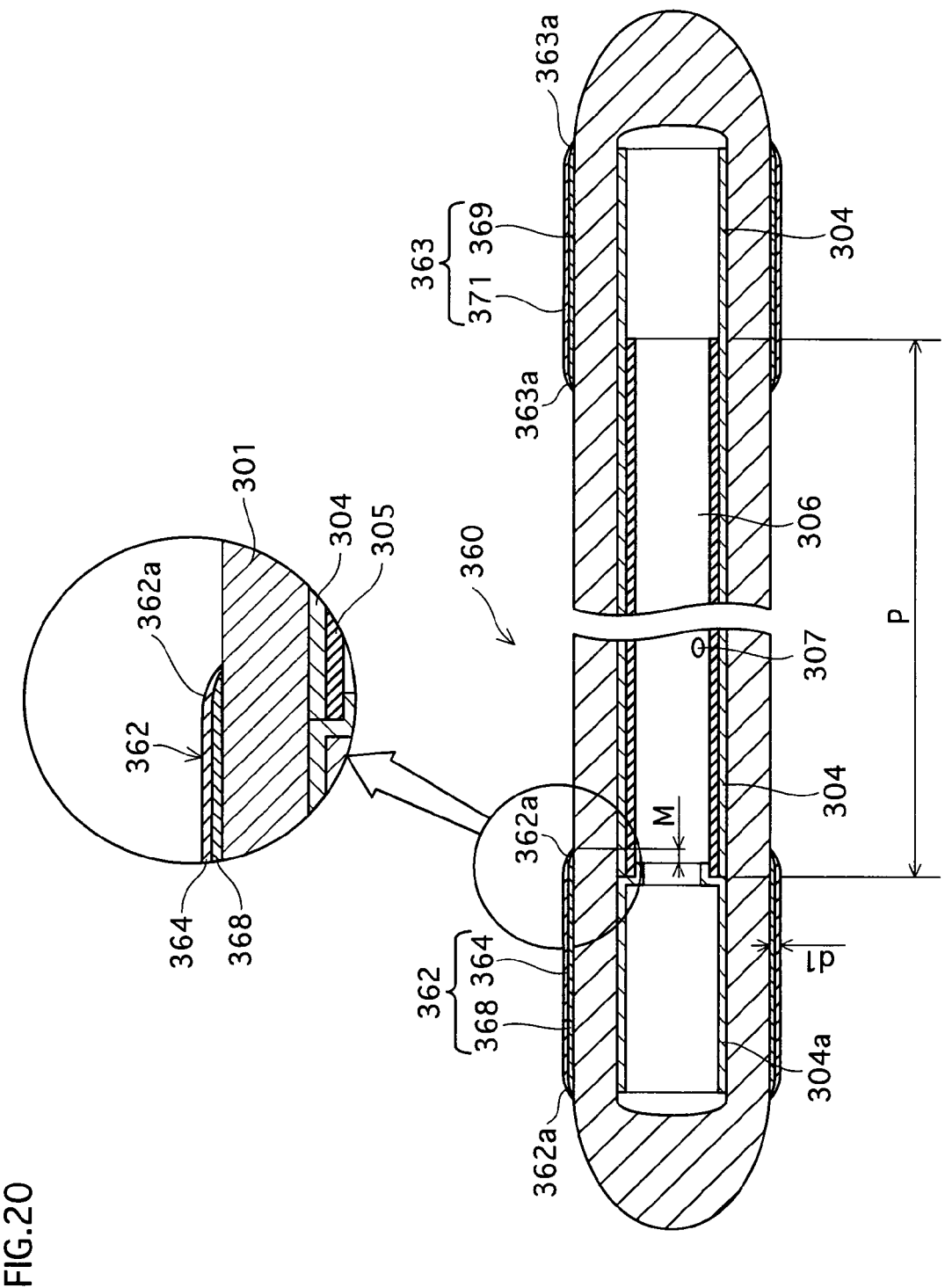
FIG. 20 is a schematic view of a lamp which is a third example according to the fourth embodiment.

FIG. 20 is a schematic view of a lamp 360 which is a third example in the fourth embodiment. In FIG. 20, components which are the same as those in the lamp 300 of the first example have been given the same reference numerals and their explanation has been omitted.

The third example differs from the first example in the following. External electrodes 362 and 363 are cylinders having openings at both ends in the tube axis direction. The external electrodes 362 and 363 are composed respectively of electrode body layers 368 and 369 and coating layers 364 and 371. The electrode body layers 368 and 369 are formed by applying a conductive paste, that mainly contains silver or copper, to the outer surface of the glass bulb 301. The coating layers 364 and 371 are disposed on the electrode body layers 368 and 369, and mainly composed of solder with a composition of 95.2 wt % tin, 3.8 wt % silver, and 1.0 wt % copper. A maximum thickness of the external electrodes 362 and 363 is 70 μm or less, and a thickness of ends 362a and 363a of the external electrodes 362 and 363 decreases toward edges.

In the third example, the external electrodes 362 and 363 have a maximum thickness d1 of 20 μm, and the ends 362a and 363a of the external electrodes 362 and 363 have a beak shape that tapers circularly toward the edges.

The external electrodes 362 and 363 have a substantially uniform thickness, except at and near the ends 362a and 363a. It should be noted here that the shape of the ends 362a and 363a is not limited to a beak. For example, the ends 362a and 363a may be tapered linearly toward the edges.

In such a case, to suppress the generation of ozone and the pealing of the external electrodes 362 and 363 from the glass bulb 301, the surface of the glass bulb 301 and the surface of the linearly tapered ends 362 and 363a preferably forms an angle of 45 degrees to 5 degrees.

In the third example, the maximum thickness of the external electrodes 362 and 363 refers to a maximum thickness of the substantially uniformly thick part of the external electrodes 362 and 363.

Which is to say, the maximum thickness of the external electrodes 362 and 363 refers to a maximum thickness of part of the external electrodes 362 and 363 that covers the outer surface of the glass bulb 301 to induce a discharge in the glass bulb 301. Therefore, in the case where a projection or the like is formed in part of the external electrodes 362 and 363 to supply power, the maximum thickness of the external electrodes 362 and 363 does not include such a projection.

According to the third example, the ends 362a and 363a of the external electrodes 362 and 363 are tapered toward the edges. This suppresses a corona discharge, thereby preventing ozone generation. Since there is no need to provide an insulating member on a glass bulb to suppress-ozone generation as in an external electrode discharge lamp disclosed in Japanese Patent Application Publication No. 2003-257377, a decrease of luminous flux caused by blocking a part of a light extracting area can be avoided, and a slim external electrode discharge lamp with a favorable appearance can be realized.

Here, since the solder of the coating layers 364 and 371 contains silver, a phenomenon that silver in the electrode body layers 368 and 369 flows into a solder vessel during solder dipping hardly occurs. To avoid this phenomenon, the silver content is preferably in a range of 1.0 wt % to 8.0 wt %.

Also, to strengthen the connection between the electrode body layers 368 and 369 and the coating layers 364 and 371, it is preferable to polish the surfaces of the electrode body layers 368 and 369 to widen a flat area, thereby improving wettability with the coating layers 364 and 371.

The composition of the solder for forming the coating layers 364 and 371 is not limited to the above. For example, the solder may include at least one of bismuth, zinc, lead, and the like. In view of environmental protection, however, it is preferable not to include an environmentally-burdening material such as lead or antimony.

Also, the coating layers 364 and 371 may be formed from a material other than solder. For example, the coating layers 364 and 371 may be nickel layers formed by electroless plating. Furthermore, the external electrodes 362 and 363 may include layers other than the electrode body layers 368 and 369 and the coating layers 364 and 371.

4. Fourth Example

Figure 21:
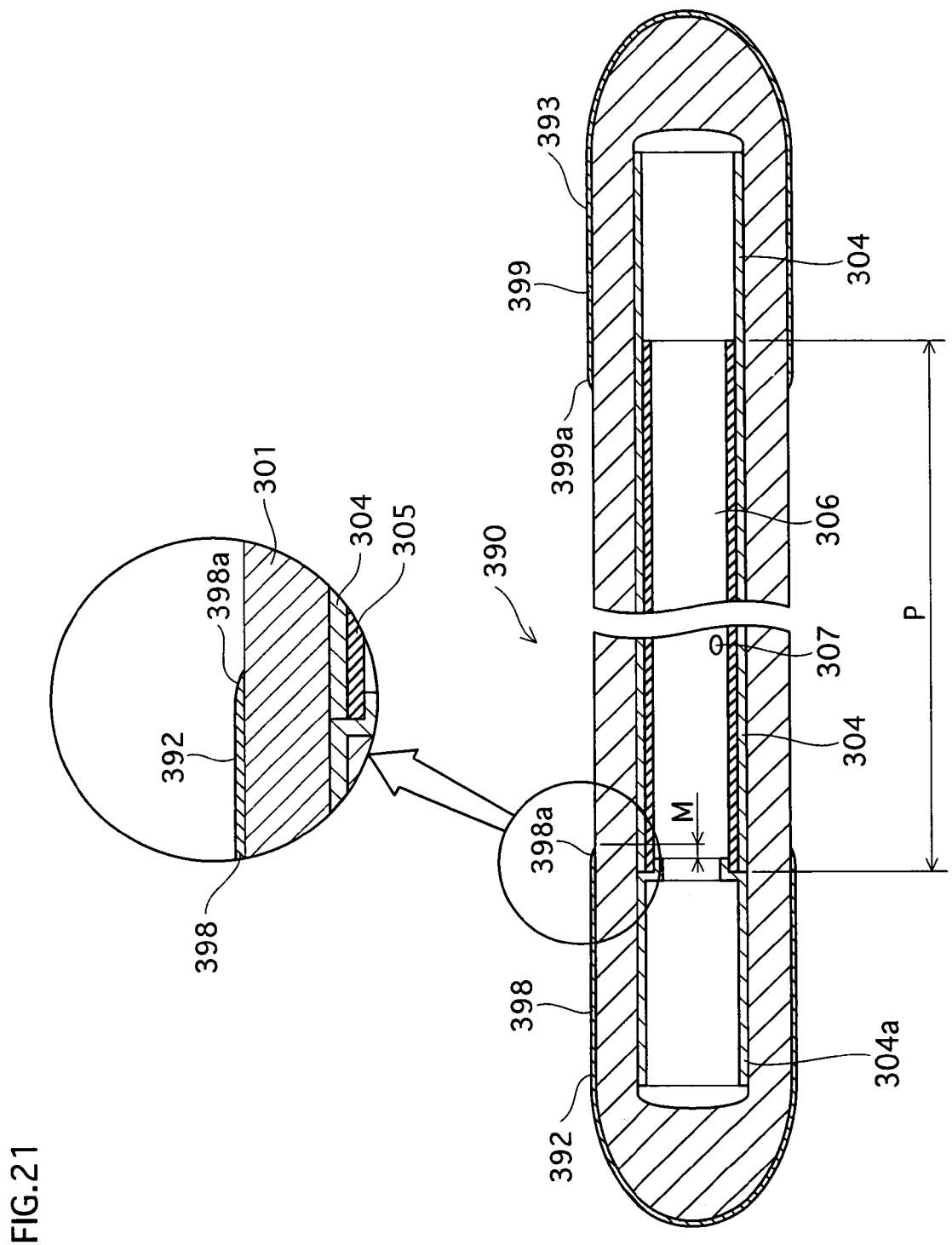
FIG. 21 is a schematic view of a lamp which is a fourth example according to the fourth embodiment.

FIG. 21 is a schematic view of a lamp 390 which is a fourth example in the fourth embodiment. In FIG. 21, components which are the same as those in the lamp 300 of the first example have been given the same reference numerals and their explanation has been omitted.

The fourth example differs from the first example in the following. External electrodes 392 and 393 are shaped like a cap, and are composed of conductive layers 398 and 399 that mainly contain zinc, an alloy of zinc and indium, or an alloy of zinc and bismuth and are formed on the outer surface of the glass bulb 301 by ultrasonic solder dipping. A maximum thickness of the conductive layers 398 and 399 is no more than 20 μm, and ends 398a and 399a of the conductive layers 398 and 399 have a beak shape that tapers circularly toward the edges.

Note here that the shape of the ends 398a and 399a is not limited to a beak. For example, the ends 398a and 399a may taper linearly toward the edges. In such a case, to suppress ozone generation and peeling of the conductive layers 398 and 399 from the glass bulb 301, the surface of the glass bulb 301 and the surfaces of the linearly tapered ends 398a and 399a of the conductive layers 398 and 399 preferably form an angle of 45 degrees to 5 degrees.

In the fourth example, the conductive layers 398 and 399 have a substantially uniform thickness, except at and near the ends 398a and 399a. Also, to strengthen the connection with the glass bulb 301, the conductive layers 398 and 399 preferably contain at least one of antimony, zinc, and aluminum as an addition agent. In view of environmental protection, however, it is preferable not to include an environmentally-burdening material such as zinc or antimony.

According to the fourth example, the ends of the external electrodes 392 and 393 become thinner toward the edges. This suppresses a corona discharge, thereby preventing ozone generation. Also, the external electrodes 392 and 393 of the fourth example have a single-layer structure, unlike the first to third examples. Therefore, a slimmer external electrode discharge lamp can be realized.

It should be noted that the external electrodes at both ends of the glass bulb need not be of an identical shape, as the shapes of the first to fourth examples can be freely combined.

<Modifications>

1. Na Content

The first embodiment describes the case where the soda glass used for forming the glass bulb contains about 16 wt % Na$_2$O, but this is not a limit for the present invention.

In the present invention, the in-dark starting characteristic is improved by using the alkaline metal which is precipitated from the glass material of the glass bulb. In other words, it is sufficient to precipitate an amount of alkaline metal enough to improve the in-dark starting characteristic. In view of workability of soda glass, the alkaline metal content is preferably in a range of 5 wt % to 20 wt %.

If the alkaline metal content is below 5 wt %, there is a high possibility that the in-dark starting time exceeds one second. If the alkaline metal content is more than 20 wt %, on the other hand, the glass bulb may be whitened by long hours of use and as a result the luminance drops, or the strength of the glass bulb may decrease.

In view of environmental protection, it is preferable to use soda glass that contains the above range of alkaline metal and also no more than 0.1 wt % lead (the so-called lead free glass), and more preferably no more than 0.01 wt % lead.

2. Alkaline Metal

The first embodiment describes an example of precipitating Na (more precisely sodium oxide), but the alkaline metal to be precipitated is not limited to Na. The alkaline metal may be any alkali metal of group I such as Na and K or any alkaline earth metal of group II such as Ba and Ca.

An alkaline metal generally has lower electronegativity than glass, and a higher emission coefficient than glass. Such an alkaline metal can be precipitated easily from the glass bulb, and serves to improve the in-dark starting characteristic of an external electrode fluorescent lamp that does not have electrodes inside.

When soda glass is used as the material of the glass bulb, an alkaline metal (e.g. Na) precipitated from the soda glass reacts with the phosphor layer, which causes degradation of the phosphor layer. According to the above embodiments, however, the protective layer is formed between the soda glass and the phosphor layer to prevent such reaction, so that the degradation of the phosphor layer can be suppressed.

3. Formation Area of the Phosphor Layer

The first embodiment describes the case where the phosphor layer is formed entirely between the inner ends of the external electrodes 31 and 32 (B-B in FIG. 5). This is to maximize the light extracting area, and also to prevent degradation of the housing 10 and the like caused by leakage of ultraviolet light, which has not been converted to visible light by the phosphor layer, from the lamp 20. Meanwhile, the phosphor layer is not formed at the ends of the glass bulb (where sodium oxide is present). Since a discharge basically occurs between the pair of external electrodes 31 and 32, ultraviolet light emission at the ends of the glass bulb is smaller than that between the external electrodes 31 and 32 and so can be ignored.

4. Formation Areas of the Protective Layer and the Phosphor Layer

The first embodiment describes the case where the phosphor layer is formed entirely between the inner ends of the external electrodes and the protective layer is formed entirely between the outer ends of the external electrodes, but this is not a limit for the present invention. So long as the protective layer formation area is wider than the phosphor layer formation area, the reaction between the alkaline metal precipitated from the soda glass and the phosphor layer can be prevented.

By forming the protective layer wider than the phosphor layer, the degradation of the phosphor layer can be suppressed. In view of this, the protective layer need not be formed in the whole area between the outer ends of the external electrodes.

Figure 22A:
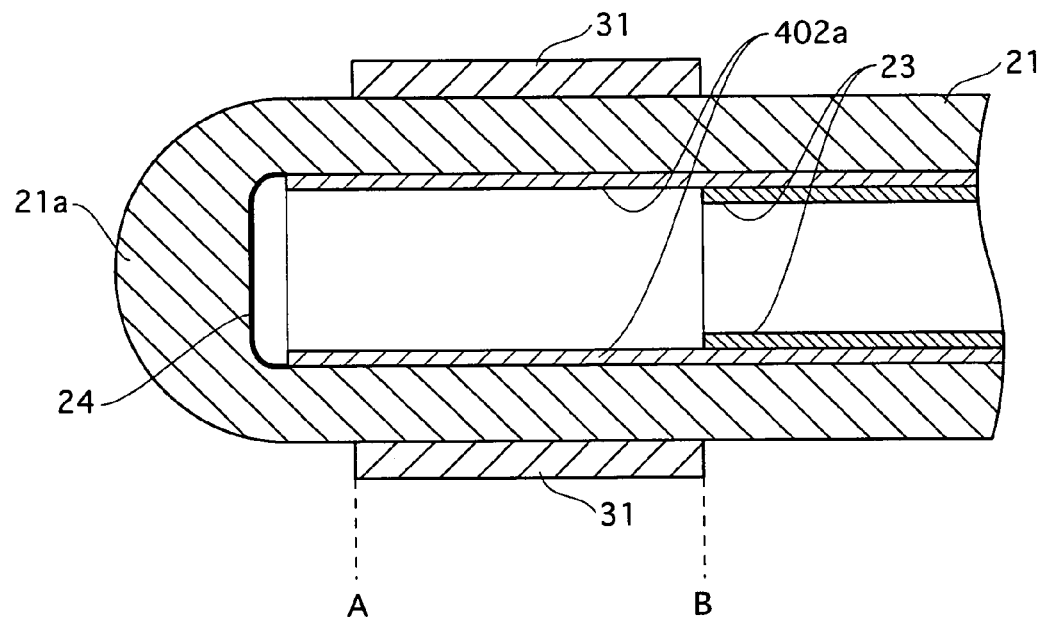
FIG. 22 shows examples of modification to a protective layer formation area of the first embodiment.
Figure 22B:
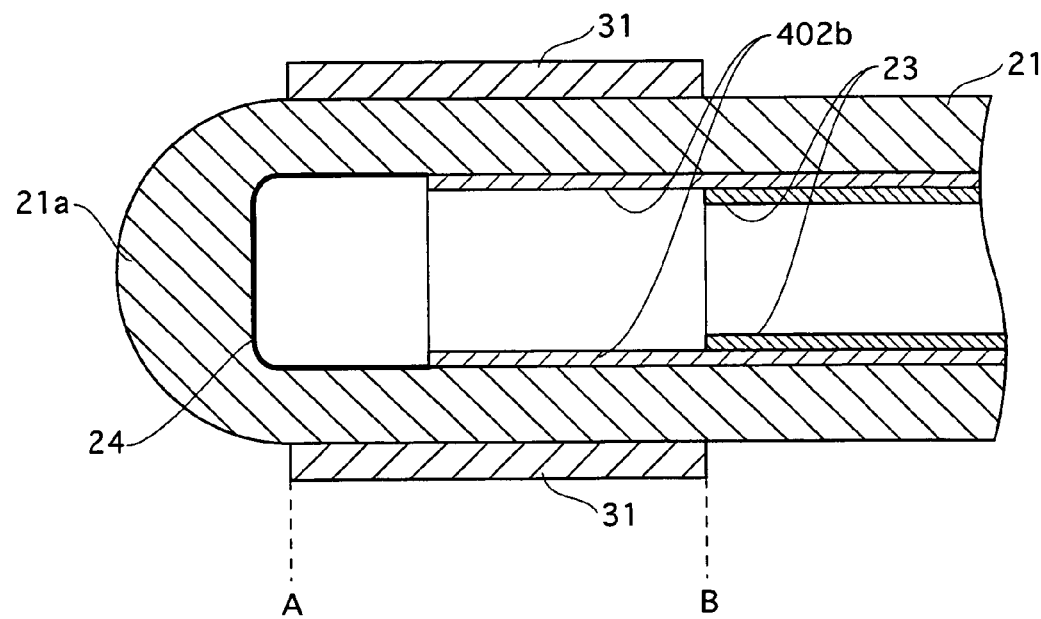

FIGS. 22A and 22B show protective layer formation areas according to this modification.

In FIG. 22A, an end of a protective layer 402a is closer to the tip of the end 21a of the glass bulb 21 than the outer end (A) of the external electrode 31 is, in the tube axis direction. Thus, the protective layer 402a is formed wider than the area between the outer ends (A-A) of the external electrodes 31 and 32.

In FIG. 22B, an end of a protective layer 402b is farther from the tip of the end 21a of the glass bulb 21 than the outer end (A) of the external electrode 31 is, in the tube axis direction. Thus, the protective layer 402b is formed narrower than the area between the outer ends (A-A) of the external electrodes 31 and 32, and wider than the area between the inner ends (B-B) of the external electrodes 31 and 32.

With these protective layers 402a and 402b, the direct contact between the alkaline metal precipitated from the soda glass and the phosphor layer 23 can be prevented. As a result, the reaction between the alkaline metal and the phosphor layer 23 is suppressed, with it being possible to keep the phosphor layer 23 from degradation.

Here, the protective layer (22, 402a, 402b) is preferably formed in the areas corresponding to the external electrodes 31 and 32, for the following reason. Electrons in the discharge space 25 are attracted to the external electrodes 31 and 32 and collide with the inner surface of the glass bulb 21. If the protective layer (22, 402a, 402b) is formed on the inner surface of the glass bulb 21 where the external electrodes 31 and 32 are situated, however, the electrons in the discharge space 25 are kept from directly colliding with the inner surface of the glass bulb 21, so that the occurrence of pinholes in the inner surface can be prevented.

Especially, the end of the protective layer (22, 402a, 402b) is preferably closer to the tip of the end 21a of the glass bulb, than a substantial center between the outer end (A) and the inner end (B) of each of the external electrodes 31 and 32 is. This is because an electric field increases from the substantial center of the outer end (A) and the inner end (B) of each of the external electrodes 31 and 32 toward the inner end (B). Electron energy increases in an area having a high electric field. When such electrons collide with the inner surface of the glass bulb 21, the inner surface is likely to be perforated with pinholes. Therefore, by covering an area having a high electric field with the protective layer, the inner surface of the glass bulb 21 can be reliably protected.

In the above embodiments, the protective layer is formed on the inner surface of the glass bulb. Alternatively, a protective film may be provided so as to cover each particle of at least one type of phosphor. For example, each phosphor particle is covered with a metal oxide such as yttrium oxide using the formation method described in the second embodiment, and a phosphor layer which is composed of the phosphor particles each covered with the metal oxide is disposed directly on the inner surface of the glass bulb.

By coating each phosphor particle with the protective film in such a way, it becomes unnecessary to provide the protective layer on the inner surface of the glass bulb. In this case, Na precipitated from the glass bulb appears in the area where the phosphor layer is not formed, i.e. on the part of the inner surface of the glass bulb that is exposed to the discharge space. When considering the improvement of the in-dark starting characteristic alone, the protective layer described in the first embodiment and the like and the metal oxide which covers the phosphor particles may be omitted.

5. Ends of the Glass Bulb (1) End Shape

The first embodiment describes the case where the inner surface of each of the ends 21a of the glass bulb 21 (the surface facing the discharge space 25) has a flat shape that is substantially orthogonal to the axis of the glass bulb 21 (see FIG. 5). However, this is not a limit for the present invention.

Figure 23A:
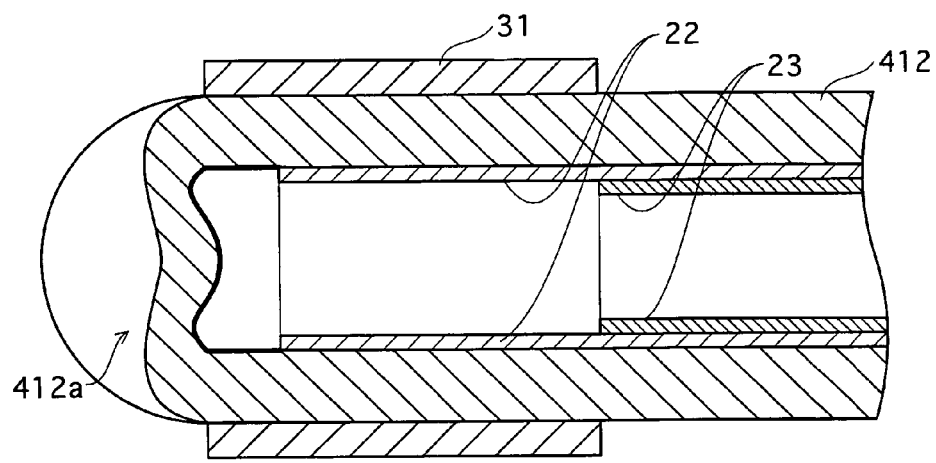
FIG. 23 shows examples of modification to a glass bulb end shape of the first embodiment.
Figure 23B:
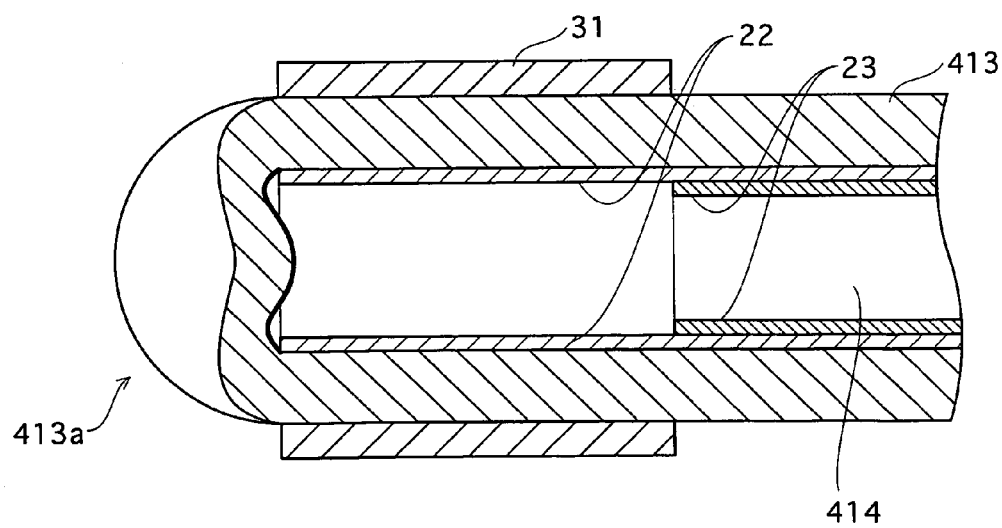

FIGS. 23A and 23B show glass bulb end shapes according to this modification.

In FIGS. 23A and 23B, inner surfaces of ends 412a and 413a of glass bulbs 412 and 413 are both bulged toward a discharge space 414.

(2) End Structure

In the above embodiments, the ends of the glass bulb are sealed by pinch sealing. According to this method, the inner surface of each of the ends 21a of the glass bulb 21 is flattened as shown in FIGS. 5B and 22. Note that these drawings illustrate the case where pinching is performed in a direction orthogonal to a paper surface.

Alternatively, methods other than pinch sealing may be used to seal the ends 21a. For example, when a tip-off method is used, the ends 412a and 413a of the glass bulb 412 and 413 are bulged toward the discharge space 414, as shown in FIG. 23.

Figure 24:
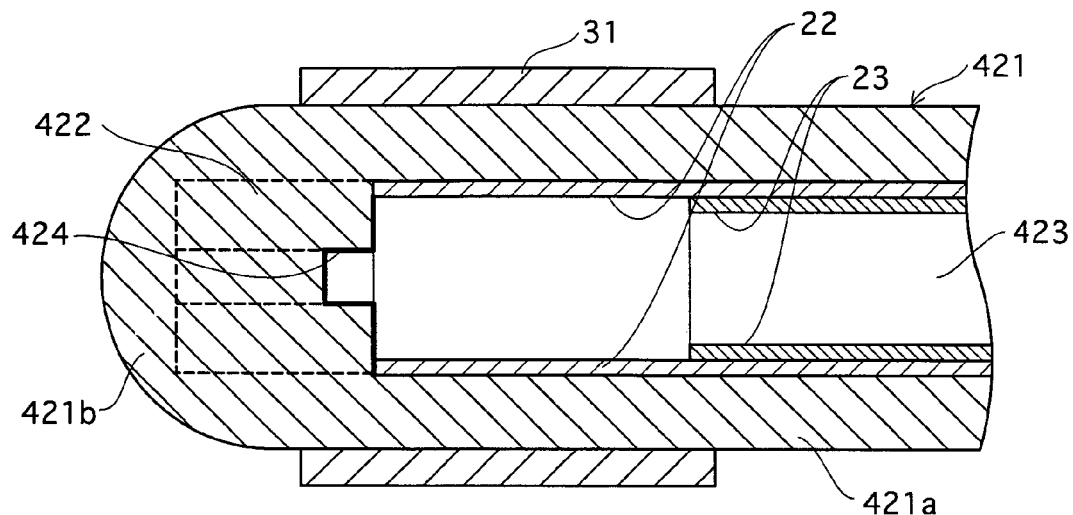
FIG. 24 shows an example of modification where an end of a glass bulb is sealed using a bead.

Also, the ends of the glass bulb may be sealed using a bead. FIG. 24 shows an example of sealing the ends of the glass bulb using a bead, according to this modification.

In this sealing method, after inserting a bead 422 whose external diameter is close to an internal diameter of a glass bulb 421 (a glass tube 421a) to an end of the glass tube 421a, a part 421b of the glass tube 421a where the bead 422 is inserted is heated to fuse the glass tube 421a and the bead 422 together.

According to this method, the inner surface of the end of the glass bulb 421 facing a discharge space 423 (including the bead) can be formed in a desired shape. For example, by using a sphere bead, the inner surface can be bulged toward the discharge space 423 in the form of a hemisphere. Also, by using the bead 422 having a flat end, the inner surface can be flattened as shown in FIG. 24. Note that reference numeral 424 in FIG. 24 denotes the same sodium oxide as in the first embodiment.

(3) Internal Diameter

In the above embodiments, the glass bulb has an elliptic cross section with an internal diameter (minor axis) of 2.8 mm. The internal diameter of the glass bulb is preferably no more than 8 mm. If the internal diameter of the glass bulb is more than 8 mm, a heat dissipation effect of a surface area of the glass bulb becomes excessively high, which causes a delay in luminance rise.

Especially, a distance ("an internal diameter on a minor axis" is equivalent to twice this distance) between the axis of the glass bulb and the inner surface of the glass bulb situated on a light extracting side (on a front panel side when used in a backlight unit) is preferably in a range of 0.8 mm to 2.0 mm, irrespective of the cross sectional shape of the glass bulb. In detail, if the cross section of the glass bulb is a circle, the internal diameter is 1.6 mm to 4.0 mm. If the cross section of the glass bulb is an ellipse as in the above embodiments, the internal diameter on the minor axis is 1.6 mm to 4.0 mm.

By limiting the distance between the axis of the glass bulb and the inner surface of the glass bulb on the light extracting side to the above range, excellent lamp efficiency can be achieved.

(4) Cross Section

The first embodiment describes the case where the glass bulb has an elliptic cross section as mentioned earlier, but the glass bulb may have other cross sections such as a circle.

A thin glass bulb formed using soda glass has a lower mechanical strength than a glass bulb of the same size formed using borosilicate glass. However, a glass bulb having a flattened cross section has a larger diameter on a major axis, for example when compared with a glass bulb of a circular cross section whose diameter is equal to a minor axis diameter. This being so, a glass tube (glass bulb) having a flattened cross section has higher rigidity (moment of inertia of area) than a glass tube (glass bulb) having a circular cross section, and therefore has a higher mechanical strength.

The flattened cross section may cause an increase in size of the glass bulb. However, for example when using a lamp having such a flat glass bulb in a backlight unit, an increase in thickness of the backlight unit can be prevented by coinciding a thickness direction of the backlight unit with a minor axis direction of the glass bulb.

The flat shape referred to here includes not only an ellipse used in the above embodiments, but also an oval and a rounded polygon (e.g. a rounded rectangle).

6. Electrode Position

The first embodiment describes the case where the inner surfaces of the ends 21a of the glass bulb 21 are closer to the tips of the ends 21a than the outer ends (A) of the external electrodes 31 and 32 are, as shown in FIG. 5. As an alternative, the outer ends of the external electrodes 31 may be closer to the tips of the ends 412a of the glass bulb 412 than the inner surfaces of the ends 412a of the glass bulb 412 are, as shown in FIG. 23A. Also, the outer ends of the external electrodes 31 may substantially correspond in position to the inner surfaces of the ends of the glass bulb.

7. Protective Layer

The first embodiment describes the case where the protective layer 22 is made of yttrium oxide, but the protective layer may be made of other materials. For example, a metal oxide such as titania or magnesium oxide having a high relative permittivity may be used to improve a permittivity of a member in contact with the electrodes.

Also, the first embodiment describes the case where the protective layer is formed in a wider area than the phosphor layer, but this is not a limit for the present invention, as long as the protective layer keeps the phosphor layer from contact with the inner surface of the glass bulb. For example, the ends of the protective layer may substantially correspond in position to the ends of the phosphor layer.

8. Lamp Type

In the above embodiments, an external electrode fluorescent lamp which has electrodes outside a glass bulb is described as an example fluorescent lamp, but the present invention can equally be applied to a cold cathode fluorescent lamp which has electrodes (cold cathode) inside a glass bulb.

Figure 25:
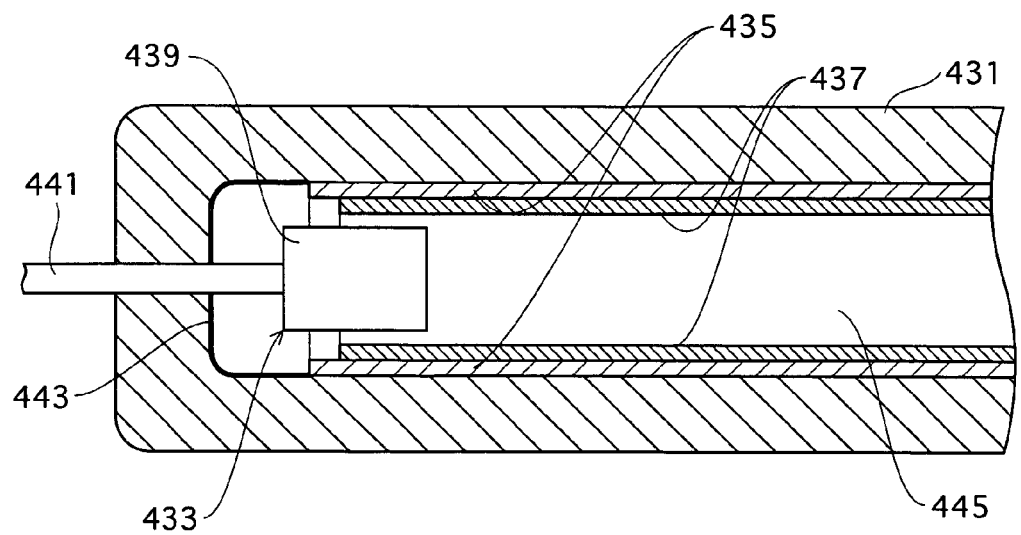
FIG. 25 is a schematic view of a cold cathode fluorescent lamp according to a modification.

FIG. 25 is a schematic view of a cold cathode fluorescent lamp 430 according to this modification.

In the drawing, the cold cathode fluorescent lamp 430 includes a glass bulb 431 and electrodes 433 sealed at both ends of the glass bulb 431 (only one end of the glass bulb 431 is shown in the drawing).

As in the first embodiment, the glass bulb 431 is made of soda glass, and a protective layer 435 and a phosphor layer 437 are formed in this order on an inner surface of the glass bulb 431. Each of the electrodes 433 includes a hollow electrode 439 with a closed bottom, and an electrode shaft 441 attached at the bottom of the hollow electrode 439. The electrode 433 is sealed in the glass bulb 431 at the electrode shaft 441.

In this cold cathode fluorescent lamp 430, the protective layer 435 is formed in an area other than the ends of the glass bulb 431, and the phosphor layer 437 is formed in a narrower area than the protective layer 435.

Also, sodium oxide 443, which is precipitated when baking the phosphor layer 437 as one example, appears at the ends of the glass bulb 431 where the protective layer 435 is absent, as in the first embodiment.

According to this construction too, the sodium oxide 443 is exposed to a discharge space 445 in the glass bulb 431, so that the in-dark starting characteristic can be improved. Also, the sodium oxide 443 can be efficiently precipitated when baking the phosphor layer 437 or sealing the electrodes 443. Hence the cold cathode fluorescent lamp 430 can be manufactured easily.

FIG. 26 is a schematic view of another cold cathode fluorescent lamp 450 according to this modification.

In the drawing, the cold cathode fluorescent lamp 450 has an external electrode 452 at one end of a glass bulb 451 and an internal electrode 453 at the other end of the glass bulb 451.

The end of the glass bulb 451 where the internal electrode 453 is placed is hermetically sealed at a lead wire 454. The internal electrode 453 is connected to a glass bulb 451 side end of the lead wire 454.

The lead wire 454 is made of tungsten. The internal electrode 453 is a hollow electrode with a closed bottom, and is formed by processing a niobium rod. In the drawing, reference numeral 455 is a phosphor layer, and reference numeral 456 is a protective layer.

9. In-dark Starting Characteristic

The third embodiment describes the case where cesium sulfate and cesium chloride are used as example cesium compounds dissipated in the protective layer to improve the in-dark starting characteristic. However, the present invention is not limited to such. For example, cesium carbonate ($Cs_2CO_3$) may be used instead.

Also, the compound dissipated in the protective layer is not limited to a cesium compound. Compounds of other alkali metals such as lithium (Li), sodium (Na), and potassium (K) are equally applicable. Also, the compound dissipated in the protective layer is not limited to an alkali metal compound. Compounds of alkaline earth metals such as magnesium (Mg), calcium (Ca), strontium (Sr), and barium (Ba) are equally applicable.

The above alkali metals and alkaline earth metals have low electronegativity. By dissipating such a material in the protective layer, the in-dark starting characteristic can be improved.

10. Lamp Shape

The first embodiment and the above modifications describe the case where the lamp is a straight tube, but the lamp may have other shapes such as a U shape and a W shape.

11. Backlight Unit

The above embodiments describe the case where the lamp is used as a light source of a directly-below backlight unit, but the lamp can also be used as a light source of an edge-type backlight unit. In this case, the lamp has a straight tube shape, an L shape, or a U shape.

12. Other Applications

The above embodiments describe the case where the lamp is used as a light source of a backlight unit, but the lamp may also be used as a light source of other lighting devices such as for general lighting.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. An external electrode fluorescent lamp comprising:
a glass bulb having a discharge space inside; and
external electrodes are provided at both ends of the glass bulb,
wherein a protective layer is formed on an inner surface of the glass bulb, except a part of the inner surface at at least one of the ends, the excepted part directly adjacent and parallel in position to a surface of the electrodes,
a phosphor layer is formed on the protective layer, and
the glass bulb contains sodium oxide in a range of 3 wt % and 20 wt %, wherein the protective layer is composed of an aggregate of metal oxide particles, and has an average thickness of no more than 2 μm and a surface roughness of no more than 1 μm.

2. An external electrode fluorescent lamp comprising:
a glass bulb having a discharge space inside; and
external electrodes are provided at both ends of the glass bulb,
wherein a protective layer is formed on an inner surface of the glass bulb, except a part of the inner surface at at least one of the ends, the excepted part directly adjacent and parallel in position to a surface of the electrodes,
a phosphor layer is formed on the protective layer, and
the glass bulb contains sodium oxide in a range of 3 wt % and 20 wt %,
wherein the protective layer contains an electron emissive material selected from the group consisting of a cesium compound, a lithium compound, and a barium compound, and
the protective layer is composed of an aggregate of metal oxide particles, and has an average thickness of no more than 2 μm and a surface roughness of no more than 1 μm.

3. An external electrode fluorescent lamp comprising:
a glass bulb having a discharge space inside; and
external electrodes are provided at both ends of the glass bulb,
wherein a protective layer is formed on an inner surface of the glass bulb, except a part of the inner surface at at least one of the ends, the excepted part directly adjacent and parallel in position to a surface of the electrodes,
a phosphor layer is formed on the protective layer, and
the glass bulb contains sodium oxide in a range of 3 wt % and 20 wt %,
wherein the protective layer is composed of an aggregate of metal oxide particles, and has an average thickness of no more than 2 μm, and
an average cross sectional area of each closed hole between the metal oxide particles in the protective layer is no more than 0.1 μm$^2$.

4. The external electrode fluorescent lamp of claim 1, wherein the protective layer contains an electron emissive material selected from the group consisting of a cesium compound, a lithium compound, and a barium compound.

5. The external electrode fluorescent lamp of claim 3, wherein a number of closed holes per unit area of cross section in the protective layer is no more than four in 1 μm$^2$.

6. An external electrode fluorescent lamp comprising:
a glass bulb having a discharge space inside; and
external electrodes are provided at both ends of the glass bulb,
wherein a protective layer is formed on an entire inner surface of the glass bulb, except for a part of the inner surface at at least one of the ends, the excepted part directly adjacent and parallel in position to a surface of the electrodes,
a phosphor layer is formed on top of the protective layer and offset from the inner surface of the glass bulb by the protective layer at a location between the external electrodes, and
the glass bulb contains sodium oxide in a range of 3 wt % and 20 wt %, wherein the electrodes are external electrodes provided outside the glass bulb at both ends, and the protective layer contains a material selected from the group consisting of $Y_2O_3$, MgO, and $La_2O_3$, and has a maximum thickness in a range of 0.5 μm to 2 μm.

7. The external electrode fluorescent lamp of claim 6, wherein a part of the protective layer corresponding in position to at least one of the external electrodes contains an electron emissive material selected from the group consisting of a cesium compound, a lithium compound, and a barium compound.

8. The external electrode fluorescent lamp of claim 7, wherein the electron emissive material is situated so as to be more than 2 mm away from an inner end of the external electrode, toward a tip of an end of the glass bulb at which the external electrode is provided.

9. The external electrode fluorescent lamp of claim 6, wherein the phosphor layer includes a phosphor that at least contains magnesium, and is located between inner ends of the external electrodes.

10. The external electrode fluorescent lamp of claim 1, wherein the glass bulb has an internal diameter in a range of 1.6 mm to 4.0 mm.

11. The external electrode fluorescent lamp of claim 1, wherein the glass bulb is flattened in cross section, with an internal diameter on a minor axis being in a range of 1.6 mm to 4.0 mm.

12. The external electrode fluorescent lamp of claim 1, wherein the phosphor layer is formed entirely between inner ends of the electrodes, and the protective layer is formed entirely between outer ends of the electrodes.

13. The external electrode fluorescent lamp of claim 10, wherein the phosphor layer is formed entirely between inner ends of the electrodes, and the protective layer is formed entirely between outer ends of the electrodes.

14. An external electrode fluorescent lamp comprising:

a glass bulb having a discharge space inside; and external electrodes are provided at both ends of the glass bulb, wherein a phosphor layer is formed on an inner surface of the glass bulb, except at least one part of the inner surface at at least one of the ends, the except at least one part directly adjacent and parallel in position to a surface of the electrodes, and the glass bulb contains sodium oxide in a range of 3 wt % and 20 wt %, wherein the protective layer is composed of an aggregate of metal oxide particles, and has an average thickness of no more than 2 μm and a surface roughness of no more than 1 μm.

15. A backlight unit comprising an external electrode fluorescent lamp of claim 1 as a light source.

16. A liquid crystal display device comprising a backlight unit, the backlight unit including a plurality of external electrode fluorescent lamps of claim 1 and one high-frequency electronic ballast which illuminates the plurality of fluorescent lamps.

17. An external electrode fluorescent lamp comprising:

a glass bulb having a discharge space inside; and electrodes provided at both ends of the glass bulb, wherein a protective layer is formed on an inner surface of the glass bulb, except a part of the inner surface at at least one of the ends, a phosphor layer is formed on the protective layer, and the glass bulb contains sodium oxide in a range of 3 wt % and 20 wt %, wherein an alkaline metal precipitated from the glass bulb appears on the part of the inner surface where the protective layer is absent, wherein the protective layer is composed of an aggregate of metal oxide particles, and has an average thickness of no more than 2 μm and a surface roughness of no more than 1 μm.

18. The external electrode fluorescent lamp of claim 1, wherein the electrodes are cold cathodes provided inside the glass bulb at both ends, and an end of the phosphor layer is closer to a center of the glass bulb than an end of the protective layer is, in a longitudinal direction of the glass bulb.

19. The external electrode fluorescent lamp of claim 18, wherein the electrodes are tubular, and a part of the inner surface of the glass bulb facing tubular parts of the electrodes has an area where the protective layer is formed and the phosphor layer is not formed.

20. The external electrode fluorescent lamp of claim 1, wherein the phosphor layer contains a phosphor that absorbs the ultraviolet light of 313 nm, and a total weight proportion of the phosphor that absorbs ultraviolet light of 313 nm in a composition of the phosphor layer is larger than 50%.

21. The external electrode fluorescent lamp of claim 2, wherein the protective layer is formed by mixing a protective layer suspension with the electron emissive material selected from the group consisting of the cesium compound, the lithium compound, and the barium compound.

22. The external electrode fluorescent lamp of claim 21 wherein the protective layer is formed from by mixing a protective layer suspension with a cesium compound, and wherein the cesium compound is less than 3 wt %.

23. The external electrode fluorescent lamp of claim 1, wherein the phosphor layer has a thickness in a range of 14 μm to 25 μm.

* * * * *